United States Patent [19]

Suzuki

[11] Patent Number: 4,830,669

[45] Date of Patent: May 16, 1989

[54] METHOD OF PRODUCING AND APPLYING MORTAR

[76] Inventor: Toshiro Suzuki, Chiyozaki-jutaku 1-305, Chiyozaki-cho 2-71, Naka-ku, Yokohama-shi, Kanagawa 231, Japan

[21] Appl. No.: 30,851

[22] PCT Filed: Jan. 24, 1986

[86] PCT No.: PCT/JP86/00029

§ 371 Date: Apr. 6, 1987

§ 102(e) Date: Apr. 6, 1987

[87] PCT Pub. No.: WO87/00163

PCT Pub. Date: Jan. 15, 1987

[30] Foreign Application Priority Data

| Jul. 3, 1985 | [JP] | Japan | 60-146273 |
| Sep. 17, 1985 | [JP] | Japan | 60-205038 |
| Sep. 17, 1985 | [JP] | Japan | 60-205039 |
| Dec. 5, 1985 | [JP] | Japan | 60-274098 |
| Dec. 28, 1985 | [JP] | Japan | 60-299072 |
| Dec. 28, 1985 | [JP] | Japan | 60-299073 |
| Dec. 28, 1985 | [JP] | Japan | 60-299074 |
| Dec. 28, 1985 | [JP] | Japan | 60-299075 |
| Jan. 11, 1986 | [JP] | Japan | 61-4007 |

[51] Int. Cl.$^4$ .............................. C04B 14/02
[52] U.S. Cl. ...................... 106/97; 106/85; 106/86; 106/90
[58] Field of Search ................. 106/85, 86, 90, 97

[56] References Cited

FOREIGN PATENT DOCUMENTS 2205494  5/1974  France .
 238615  8/1925  United Kingdom ........... 106/86

*Primary Examiner*—William R. Dixon, Jr.
*Assistant Examiner*—Anthony J. Green
*Attorney, Agent, or Firm*—James H. Tilberry

[57] ABSTRACT

A method of producing and applying a cement-containing composition such as a concrete and mortar broadly used in civil, construction and various other fields is disclosed. To prepare the mortar or the like, a hydration reaction of cement and water is caused in the presence, if necessary, of aggregate such as sand or gravel. According to the present invention, small ice masses are used in lieu of water. That is, cement, aggregate and small ice masses are mixed and kneaded together in a low water-cement ratio and in a quasisolid state wetted by a small quantity of water resulting on the surfaces of the small ice masses from the melting thereof into a macroscopically homogeneous system. Subsequently, gradual transition of this system into a homogeneous mixture with the melting of the small ice masses is caused. The ice masses are entirely melted until the instant of charging of the composition thus prepared.

16 Claims, 14 Drawing Sheets

METHOD OF PRODUCING AND APPLYING MORTAR

DESCRIPTION

1. Technical Field

This invention relates to a method of preparing, producing, molding and applying a cement-containing composition such as cement paste, mortar and concrete (hereinafter referred to as mortar), in which water necessary for a hydration reaction is obtained from small ice masses.

2. Background Art

To prepare mortar, cement and water, and also such aggregate as sand or gravel if necessary, are mixed and kneaded together. According to the water-cement ratio theory, the mechanical strength of the mortar after the solidification is higher when the quantity of water is lowe with respect to cement. Recently, it has been noted that with the solidification of such a composition with a water content in the neighborhood of the minimum quantity necessary for the hydration of cement, a very high mechanical strength can be obtained while also obtaining the necessary compression strength and the necessary tensile strength, bending strength and shearing strength.

The preparation of mortar also requires workability. More specifically, it is necessary to ensure adequate softness, fluidity, viscosity and plasticity, these factors being related to the difficulty or easiness of handling mortar or the like before solidification, i.e., during preparation, charging, molding, etc. Usually, a considerably greater amount of water than the amount necessary for the hydration of the cement is used to ensure workability. Also, various additives are used to reduce the amount of water. However, the minimum quantity of water necessary for the hydration is very small so that it is difficult to ensure workability with such small amount of water. Further, the mechanical strength after solidification depends not only on the water-cement ratio, but also on the homogeneity of the mixture of cement and aggregate, the agitation and kneading during the hydration reaction also being important factors which are difficult to carry out.

In a further aspect, since the hydration reaction proceeds as the mortar is agitated and kneaded with water, there are time restrictions on the transportation of raw mortar. Sometimes, a retarder is used. However, generally it is difficult to control the hydration reaction time.

In a still further aspect, in the preparation of mortar there are problems to be solved in connection with early release from a mold, i.e., early build-up of mechanical strength, facilitation of press molding and freedom from shrinkage. Various attempts have been made to solve these problems by using various additives. These attempts, however, have merits and demerits of their own.

Further, there have been attempts to reduce breeding of the mortar composition, suppress dispersion for underwater charging purposes and improve fluidity by incorporating water-soluble polymers such as cellulose derivatives, e.g., methylcellulose and hydroxyethylcellulose, or polyvinyl alcohol.

These water-soluble polymers (hereinafter referred to as polymers) are added in the form of powder or as aqueous solution to the composition before and after kneading and the admixture is then agitated and kneaded. However, when methylcellulose, for instance, is added in the form of powder, it is liable to be agglomerated into masses. When it is added as an aqueous solution, the viscosity of the composition being agitated is extremely increased. In either case, a great deal of labor and time are required for the kneading to obtain a homogeneous composition. Particularly, it is difficult to obtain a low water-cement ratio composition.

Further, in the case of heavy concrete used for the shields in atomic power generation facilities or the like, separation of aggregate from mortar portion is liable to result. The separation stems from the combination of the specific gravity difference, fluidity difference, size difference, etc. between the aggregate and mortar component. More specifically, the separation is pronounced when the specific gravity difference and slump are large while the viscosity of the mortar component is low. The separation is promoted by the compaction with a vibrator or the like. Therefore, heavy concrete using high specific gravity aggregate is liable to lack in density uniformity, leading to defects in shields.

Usually, a considerably greater amount of water than is necessary for the hydration reaction of cement is used in the preparation of concrete in order to ensure sufficient workability, e.g., capability of obtaining a homogeneous mixture and capability of dense charging. For this reason, it is not easy to suppress the separation of the aggregate. Besides, the addition of water in excess of the amount necessary for the hydration reaction reduces the mechanical strength of concrete, an improvement in this respect thus having been desired.

In a still further aspect, it is said that cement mortar or concrete slurry freeze at $-0.5°$ to $2.0°$ C. with respect to the laying of mortar under low temperature conditions, e.g., in cold districts. In a cold situation where the daily average temperature is $4°$ C. or below, freezing of concrete is likely. Under such circumstances, charging of concrete slurry usually is not done. If cement composition is frozen in an initial stage of solidification, the hydration reaction of cement is retarded. In addition, this will have adverse effects on such characteristics as mechanical strength, durability and water tightness even if the composition is subsequently cured under adequate temperature conditions. Also it has been said that the freezing of the composition in the initial stage of solidification should be avoided absolutely. When laying mortar in a low temperature situation, therefore, it is necessary to store the composition in a place where cement, aggregate, etc. will not be cooled so much or avoid the use of low temperature water for kneading or provide temperature preservation means during transportation, charging, curing, etc.

There have been further attempts to reduce water as much as possible within a range, in which desired performance is obtainable, e.g., set the water-cement ratio to be less than 60%, to minimize adverse effects of freezing. The minimum quantity of water necessary for the hydration reaction of cement is usually far less than the amount of water used to prepare the concrete slurry. If a homogeneous composition could be prepared with this small quantity of water and densely molded, concrete having high mechanical strength could be obtained. However, mortar usually requires such workability as adequate softness, fluidity, viscosity and plasticity in the stage of kneading, charging, molding, etc. before solidification in order to be able to obtain a homogeneous mixture and dense charging. To this end, it is necessary to use a considerably greater amount of water than the minimum necessary quantity. Thus it is actually not easy to alleviate the adverse effects of freezing by reducing water.

In a further aspect, mortar is reinforced with reinforcement fiber, e.g., carbon fiber, glass fiber, asbestos, steel fiber or aromatic polyamide fiber. Usually, these reinforcement fibers are added as short fibers to concrete or mortar slurry to obtain fiber-reinforced mortar.

However, reinforcement fibers usually are liable to entangle into a tufty state. Also, carbon fiber, glass fiber, etc. are cut into reduced length fibers by bending forces, frictional forces, tensile forces, etc. Therefore, it has been difficult to sufficiently reinforce the mechanical strength of the solidified mortar. On the contrary to solve these problems extremely short fibers compared to the desired fiber length are used. Also, in order to reduce damage to fiber in the mixing and kneading steps, the water-cement ratio is increased to reduce the shearing force required at the time of the mixing and kneading. Therefore, it has been impossible to realize the mechanical strength inherent to fiber and mortar component under optimum conditions.

In a further aspect, with the prior art mortar which is charged in liquid phase, the effect of compression in case of press molding is soon saturated, and only poor effects of pressure application on the charging can be obtained. On the other hand, when producing plate-like members such as boards and panels, even a slight lack of balance of applied pressure will cause an inclination of the plate being pressurized, resulting in thickness irregularities and leading to inferior dimensional precision.

In a further aspect, in the use of mortar for producing a compaction pile as an example of application of mortar or the like to civil construction works, there is a following problem.

Usually, a sand compaction pile is produced by charging sand into an outer pipe and pressure driving sand into the ground and compacting it while raising the outer pipe. Where there is no need of expecting a dehydration effect of the sand pile, it may be thought that the sand pile is solidified through reaction with underground water in the ground if cement or quartz is mixed with sand. However, unless underground water sufficiently permeates into the sand pile, the sand pile will not be solidified entirely but only its surface portion is solidified. In addition, a considerable period is required until solidification, and it is impossible to obtain a uniform mechanical strength. Further, it is difficult to compact mortar containing sand, cement and water in the ground, and there are many cases where the production of sitecharged concrete piles is preferred.

Further, in the case of the prior art site-charged concrete there is a possibility of separation of the concrete composition into the aggregate and cement while the composition has not yet been solidified after charging, and it is liable to compact insufficiently in the ground.

The present invention seeks to solve the problems discussed above in the prior art. According to the present invention, small ice masses are used in lieu of water in the preparation of mortar, thereby permitting preparation of high quality, homogeneous mortar with a under the low watercement ratio.

There are two well-known publications concerning cement-containing compositions, for which ice masses are used in lieu of water. One of these is the specification of Japanese Patent Publication No. Sho 53-005694 (JP, B2, No. 53-005694) entitled "Method of Manufacturing Construction Boards". This patent concerns a method of manufacturing construction boards of hydraulic binders by mixing a powdery hydraulic binder cooled to a temperature below the melting point of water and crushed ice or frozen water in the form like snow substantially in a dry state. The resultant, substantially dry mixture is compressed to a predetermined thickness with solidifying and drying at a temperature above the melting point of water.

The other publication is ACI (American Concrete Institute) Journal, December 1972, ACT Committee 224, "Control of Cracking in Concrete Structures", 8.5.5 Cold Concrete. The publication discloses low-temperature concrete, in which the measured kneading water is totally or partly replaced with small ice pieces. Mentioned effects of this low-temperature concrete are reduction of the temperature difference in mass concrete works, reduction of slump loss when the ambient temperature is high and increase of pumpability.

DISCLOSURE OF INVENTION

According to the present invention, there is provided a method of producing low water-cement ratio cement-containing composition with small ice masses used in lieu of water, which comprises the steps of mixing and kneading together cement, aggregate and small ice masses in a quasi-solid state wetted by a small quantity of water resulting on the surfaces of the small ice masses from the melting thereof into a macroscopically homogeneous system, and causing a gradual transition of the slurry into a homogeneous mixture with the melting of the small ice masses, the small ice masses being substantially entirely melted prior to the instant of charging of the composition thus obtained.

In this method according to the present invention, the small ice masses are partly melted, and the cement, aggregate and small ice masses are mixed and kneaded together in the "quasi-solid state", which is referred to so in accordance with the present invention, and is wetted by the resultant water. Ice masses having wetted surfaces carry cement particles and/or small aggregate particles attached to the surfaces. The attached particles absorb slight water to become viscous. Consequently, small masses with ice masses as cores are formed. The quasi-solid state is one, in which such small masses coexist with cement and aggregate in the solid phase.

In the quasi-solid state, the small ice masses behave as small masses havng viscous surfaces even if the quantity of small ice masses is small in case of a low water-cement ratio. These small ice masses thus are dispersed in the surrounding particles of cement and aggregate, and a macroscopically homogeneous system where the aggregate are uniformly dispersed can be readily obtained through mixing for a short period of time, which is primarily a convection mixing. Hence, the primary purpose of the quasi-solid state can be fulfilled so long as it is present for a comparatively short period of time in an initial stage mixing and kneading of the composition.

Through the stage of this macroscopically homogeneous system, the small ice masses are gradually melted under the ambient temperature condition, the resultant water wetting the surrounding solid particles. In this way, there occurs a transition from the quasi-solid state to a viscous homogeneous mixture. In a state very close to the solid phase or in a low viscosity state with much water, separation of the aggregate is liable so that it is difficult to obtain a homogeneous mixture. In the method according to the present invention, the macroscopically homogeneous system is obtained in the quasi-solid state, then a transition of the system to a low water-cement ratio and high viscosity mixture. Therefore, separation of the aggregate is less liable to result.

Usually, mortar or the like is charged after having been kneaded and transported to the site of charging. With the method according to the present invention, the composition is in the quasi-solid state at the commencement of kneading. In this state, the small ice masses are dispersed to form the macroscropically homogeneous system, and then the ice masses are entirely melted. The composition is thus charged as a homogeneous mixture. If the composition is charged in the presence of residual ice masses, cavities are liable to be formed, which is not preferable.

At the instant of charging, the composition is a homogeneous system free from residual ice masses. In the state where there are residual ice masses, the hydration reaction has not substantially proceeded. Even after the melting of the ice masses, the hydration reaction is proceeding gradually under a low temperature condition. Thus, it is possible to charge the composition without increase of viscosity, i.e., reduction of plasticity, use to the progress of hydration reaction but under satisfactory working conditions and thus obtain a solidified composition having high mechanical strength and homogeneity.

In accordance with the present invention, the range of the low water-cement ratio is a range, in which the kneading of a composition using water in the prior art method has required considerable force and difficultly to obtain a homogeneous slurry, and also a range, in which the charging performance is greatly affected by the slump loss due to progress of the hydration reaction from the kneading until the charging.

Under conditions where no water reuuction agent is used and the charging is done ordinarily using a vibrator and without use of any pressure application means, the low water-cement ratio range is approximately 5 to 30% in the case of cement paste. In the case of mortar which is obtained by adding sand to the cement paste or in the case of concrete where gravel is added to mortar, the workability is reduced, so that it is necessary to increase the water-cement ratio compared to the cement paste. For example, the ratio should be 15 to 40% in the case of mortar which contains cement and gravel in proportions of 1:2 and 25 to 45% in the case of concrete, which contains cement, sand and gravel in proportions of 1:2:2. From these considerations, the water-cement ratio range which corresponds to the low water-cement ratio range, in which the method according to the present invention can be used effectively, is numerically defined to be less than 45%.

Regarding the size of small ice masses used in accordance with the present producing method, the smaller the size is the more homogeneous mixture can be obtained. However, there are lower limits on the size imposed by the method of preparation of ice masses, temperature control capability and other factors. Further, the necessity of the smallness of ice masses varies with the water-cement ratio and other conditions. From the practical standpoint, what is obtained by slicing ice using an ice slicer can be sufficiently used as small ice masses for concrete with a water-cement ratio outside a very low range. Further, it is possible to use granular ice, small ice pieces and snow. The ice masses that can be used may be in a large variety of shapes and forms.

The microparticles of cement have an effect of causing dispersion of ice masses. Therefore, even ice masses in a chain-like form, for instance, may be separated from one another and dispersed uniformly once the operation of mixing and kneading is started. Further, the presence of macroscopic water film on the ice mass surfaces gives no rise to any problem. Therefore, according to the present producing method there is no need of maintaining a very low temperature or a very narrow temperature range during preparation of ice masses. Where large quantities of small ice masses are required, small ice masses prepared using an ice slicer may be preserved at a temperature below the melting point of ice, if possible at a temperature at which no quasi-liquid layer is formed on the ice surface, and crushed when using them. (They may be very easily crushed.) When preparing paste mortar or the like with a water-cement ratio in a very low range, it is necessary to accurately control the size of small ice masses used.

Further, according to the present producing method it is possible to preliminarily add such additives as a retarder, a water reducer, an AE agent and a viscosity increaser, e.g., a water-soluble polymer, to the cement, aggregate, etc. and then add small ice masses to obtain mortar. A water-soluble polymer based on cellulose, e.g., methylcellulose, is difficultly soluble in water and provides high viscosity, so that it can be difficultly incorporated in a cement-containing composition, particularly of a low water-cement ratio. In the method according to the present invention, which uses small ice masses, methylcellulose is readily dissolved in water at a low temperature which coexists with small ice masses and low viscosity is maintained so that it can be uniformly incorporated in the cement-containing composition.

The method of preparing mortar or the like according to the present invention is set apart in the purpose from the two prior art techniques using ice masses disclosed in the publications noted above in "BACKGROUND ART". However, the method according to the present invention partly overlaps the former prior art technique in connection with the utility of ice masses and overlaps the latter prior art technique in connection with a low temperature effect. In this respect, therefore, the positioning of the method according to the present invention with respect to the prior art will be made. The method according to the present invention makes positive use of the process of melting of ice masses and, in this respect, can have the advantages of the prior art techniques noted above from the standpoints of the readiness of industrialization, range of the water-cement ratio capable of being dealt with and effectiveness for obtaining necessary characteristics. More specifically, according to the present invention the temperature control system in the former prior art technique is greatly simplified, thus bringing about an advantage that the separation of aggregate can be suppressed by the viscosity of the mixture that is obtained with the melting of ice masses after the mixing and kneading. Also it is a great development from the latter prior art technique in that it is possible to readily obtain even a homogeneous mixture with a very small water content by forming a quasi-solid state using small ice masses.

The incorporation o the water-soluble polymer noted above will now be described in detail. In the preparation of mortar or the like containing a water soluble polymer, the water-soluble polymer is first dissolved in water, the resultant solution is then frozen to obtain ice masses which contain the water-soluble polymer. These ice masses are added to and mixed with the rest of the cement-containing composition.

The polymer solution ice masses behave like aggregate in the composition. These ice masses can be readily uniformly dispersed in the solution by agitation mainly based on convection agitation before increase of viscosity due to liberation of the polymer. Water and polymer with the melting are gradually liberated into the surrounding composition to form a homogeneous composition. More specifically, the polymer is primarily dispersed with the dispersion of the ice masses, and it is then gradually liberated from the surfaces of the dispersed ice masses to be readily secondarily dispersed in the surrounding composition even with viscosity increase of the composition due to the liberation of polymer. In this way, the polymer is uniformly incorporated in the composition.

Thus, with this method of preparation, high homogeneity mortar can be readily obtained without difficulty of mixing or kneading or reduction of homogeneity or formation of masses of composition due to high viscosity.

In the method of preparation according to the present invention, the total quantity of water used (except for water introduced in a state attached to the aggregate) may be added entirely as crushed ice pieces or partly as water and as crushed ice pieces for the rest. Further, it is possible to add part of the water as ice masses containing a dissolved polymer and the rest of the water as mere ice masses. In this case, the mere ice masses may be added to the mixture consisting of cement, aggregate, etc. and after the mixing and kneading of the admixture the ice masses containing the dissolved polymer may be added for further admixing. Further, it is possible to use water in lieu of the mere ice masses. Further, the total quantity of water used may be added as ice masses containing the dissolved polymer.

Further, ice masses added in lieu of water can be admixed with the mixture consisting of cement, aggregate, etc. in the solid state or quasi-solid state containing some water resulting from the melting of the ice masses. Besides, the ice masses carry particles of cement, sand, etc. attached to their surface. Therefore, even if the ice masses are partly melted, each ice mass with attached particles thereto behaves like a dry solid mass, so that a macroscopically homogeneous system can be obtained through kneading which is based on convection kneading. Subsequent melting of the ice masses produces water which wets the surrounding composition. It is thus possible to obtain high homogeneity mortar even with a low water-cement ratio compared to the prior art case of adding water directly.

In the method of preparation according to the present invention, a water-soluble polymer, e.g., methylcellulose, may be added in the form of powder. The water-soluble polymer such as methylcellulose, hydroxylethylcellulose or polyvinyl alcohol incorporated in a concrete slurry can improve the viscosity and suppress separation of the aggregate. However, if the polymer is added in the form of powder to the concrete slurry, it is liable to be agglomerated into masses. On the other hand, if it is added in the form of a water solution, it extremely increases the viscosity. At any rate, it is difficult to obtain uniform dispersion. This is particularly pronounced when the water-cement ratio is low. With the method according to the present invention, the polymer is primarily dispersed with the dispersion of the small ice masses and is subsequently gradually liberated with the melting of the small ice masses. It is thus possible to obtain a concrete slurry where the polymer is uniformly dispersed even in the case where the water-cement ratio is low.

The concrete slurry containing the water-soluble polymer contains residual ice masses or it has a viscosity, which is low in a low temperature state soon after the melting of the ice masses and is increased extremely with temperature rise. Thus, it is possible to have aggregate uniformly dispersed and enhance the suppression of the sinking and separation of the aggregate at the time of charging of the slurry.

According to the present invention, heavy concrete containing high specific gravity aggregate may be prepared by using small ice masses in lieu of water, setting the water-cement ratio to be less than 45%, mixing and kneading cement, aggregate and small ice pieces in a quasi-solid state wetted by a small quantity of water resulting on the surfaces of the small ice masses from the melting thereof into a macroscopically homogeneous system and causing a gradual transition thereof to a homogeneous mixture with the melting of small ice masses.

In this method, the small ice masses are partly melted, and cement, aggregate and residual small ice masses are mixed and kneaded in the "quasi-solid state" wetted by water resulting from the melting. The small ice masses carry cement particles and fine aggregate particles attached to their wetted surface. The attached fine particles absorb slight water to become viscous. Thus, small masses with the ice masses as the core are formed.

In the quasi-solid state, the small masses with the ice masses as the core behave like the solid phase even where the water-cement ratio is as low as less than 45%, and they are dispersed in the surrounding solid particles of cement and aggregate. The macroscopically homogeneous system where the aggregate is uniformly dispersed, thus can be readily obtained through mixing primarily consisting of convection mixing for a short period of time. Besides, in the quasi-solid state the surfaces of small masses with the small ice masses as the core gradually become viscous (without occurrence of such a phenomenon as the separation of high specific gravity particles that is liable to occur in the mixing of dry solid particles). Thus, even aggregate having high specific gravity can be uniformly dispersed. The quasi-solid state fulfills its end when it prevails for a comparatively short period of time in an initial stage of mixing and kneading of the composition.

In the macroscopically homogeneous system, the ice masses are gradually melted under the ambient temperature condition, the resultant water wetting the surrounding solid phase to cause a gradual transition of the composition from the quasi-solid phase to a homogeneous concrete slurry.

In the method of preparation according to the present invention, the water-cement ratio should be less than 45%. A suitable range of the ratio is 25 to 45% in the case of, for instance, concrete consisting of cement, fine aggregate and coarse aggregate in proportions of 1:2:2 (by weight). If the ratio is less than 25%, it is difficult to prepare homogeneous concrete and also it is difficult to attain sufficient compaction and dense charging using the ordinary vibrator. A ratio in excess of 45% is inadequate because the separation of high specific gravity aggregate is liable to occur in this case.

Heavy concrete prepared by the method according to the present invention may be used as shield walls of atomic power generation plants, for instance. As the aggregate in this case may be used iron pieces (which is 7.86 in specific gravity d), metal pieces such as lead pieces (which is 11.34), magnetite (which is 4.5 to 5.2), iron sand (which is 4 to 5), such iron compounds as limonite (which is 3 to 4), goethite (which is 4 to 5.3), titanic iron ore (which is 4.2 to 4.8) and ferrophosphorus (which is 5.8 to 6.3) and high specific gravity aggregates such as barite (which is 4 to 4.7) and copper slag (which is approximately 3.6).

According to the present invention, low temperature mortar or the like may be prepared under a low temperature condition by adding small ice masses in a quantity corresponding to a water-cement ratio less than 45% to the mixture of cement, aggregates etc., mixing and kneading the system in the quasi-solid state wetted by a small quantity of water resulting on the surfaces of the small ice masses from the melting thereof into a macroscopically homogeneous system and then causing a gradual transition thereof to a homogeneous mixture with the melting of small ice masses. In this method, high quality mortar or the like can be prepared.

In the macroscopically homogeneous system, the small ice masses are gradually melted under the ambient temperature condition. The resultant water is absorbed by particles, mainly of cement, so that transition to a high homogeneity system can be obtained even with a low water-cement ratio less than 45%. With the prior art method using water, it is difficult to obtain uniform dispersion of water content in a composition with a water-cement ratio less than 45%.

In the composition prepared by the producing method according to the present invention, water is very uniformly dispersed and absorbed. Besides, the watercement ratio is comparatively low, namely less than 45%. Therefore, there is no possibility for any liberated water to be condensed. The water in this state has a low freezing temperature. Even if it is frozen, it does not form any ice mass. Therefore, the freezing has less adverse effects. Further, since the composition has low water-cement ratio and contains small amount of water per unit volume, the heat of hydration reaction of cement is less consumed to raise water temperature. Therefore, if means for preserving heat is provided for a short period of time in an initial state of the curing to promote the hydration reaction, it is possible to maintain necessary temperature with the heat of reaction and cause the solidification and hardening to proceed without possibility of freezing of water.

The mortar or the like which has been prepared by the producing method according to the present invention must be a homogeneous system free from residual ice masses at the instant of charging it. In a state prior to the charging where there are residual ice masses, the hydration reaction does not substantially proceed. Also, even after the melting of the ice masses, the system is at a low temperature for a while so that the hydration reaction proceeds slowly. It is thus possible to maintain satisfactory working conditions without increase of the viscosity, i.e., reduction of plasticity, with the progress of the hydration reaction and obtain dense solidified system after charging.

The quantity of small ice masses that are used corresponds to a water-cement ratio less than 45%. In the case of mortar where cement and sand are used in proportions of 1:2, a water-cement ratio in excess of 45% leads to the presence of liberated water, which is undesired. In the case of cement paste, the water content per unit volume is increased with the same water-cement ratio as in mortar. In this case, therefore, the water-cement ratio is preferably less than 20 to 25%. However, in the case of a mortar or concrete composition incorporating ordinary aggregate the purpose of the present invention can be fulfilled by setting a water-cement ratio less than 45%.

When using reinforcement fiber to prepare mortar or the like in accordance with the present invention, the reinforcement fiber to be incorporated is frozen together with water, and ice masses thus obtained, which contain sealed reinforcement fibers, are added to the rest of the cement-containing composition.

These ice masses behave just like aggregate in the composition and can be readily uniformly dispersed through agitation mainly consisting of convection agitation. Then, as they are gradually melted, the sealed fiber, the length of which is comparatively small, is released into the composition. More specifically, the fiber is dispersed primarily with the dispersion of the ice masses containing it to form a macroscopically homogeneous system, and with the melting of the ice masses it is dispersed secondarily as individual short fibers. At this time, the water resulting from the melting of the ice masses wets the surrounding composition, so that homogeneous mortar or the like can be obtained.

Therefore, except where an extremely large quantity of fiber is incorporated, the possibility of deflocculation of fiber is low, and entangling thereof is extremely reduced. Besides, during the process of mixing and kneading, the fiber is held sealed in ice masses for long periods of time, and the opportunity that the fiber is damaged by the external force is reduced.

Further, in the producing method according to the present invention, long fibers may be frozen as reinforcement fiber together with water, and the ice thus obtained may be crushed to a predetermined size thereby obtaining fibers having a predetermined length. Of course it is oossible to freeze fibers having a predetermined length together with water and crush the resultant ice. Even if the fiber sinks when it is frozen together with water so that it is distributed non-uniformly in the resultant ice, this gives rise to no problem because the ice is crushed into small ice pieces which are uniformly dispersed.

Further, in the method according to the present invention the total quantity of water to be incorporated in the cement-containing composition (except for water that has been preliminarily attached to and introduced together with the aggregate) may be added as crushed ice pieces or, it may be added partly as water and as crushed ice pieces for the rest. For example, part of the water to be incorporated may be added as ice pieces containing sealed fiber, and the rest of the water may be added as ice pieces without any sealed fiber. In this case, the ice pieces withott any sealed fiber may first be added to the mixture consisting of cement, aggregate and other additives and, after the admixture has been kneaded, the ice masses with the sealed fiber may be added for further admixing. Further, it is possible to use water in lieu of the ice masses without sealed fiber. Further, the total quantity of water may be added as ice pieces with sealed fiber. Generally, it is essential to add the reinforcement fiber in the state sealed in ice masses to the rest of the composition. However, to add the total quantity of water in the form of ice masses with sealed fiber, makes the content of fiber in ice masses minimum, which is desired from the standpoint of preventing the entangling of the fiber.

The length of fiber used in the method according to the present invention is several millimeters to several centimeters, which is large compared to the fiber used in the prior art method. If the grain size of crushed ice pieces is set to be substantially equal to the length of the selled short fibers, the probability that the short fibers are cut with the crushing of ice can be held low, thus reducing or eliminating the adverse effects on the reinforcement. Of course it is possible to use long fibers and cut them to a desired length with the crushing of ice.

The ice with the sealed reinforcement fiber may also contain, if necessary, a surface active agent for promoting the dispersion of the fiber and also other additives such as viscosity increaser, solidification retarder and an AE agent.

According to the present invention, mortar is prepared and handled for press molding as follows. Small ice masses are added in a quantity corresponding to a water-cement ratio less than 45% to cement or to a mixture consisting of cement, aggregate, etc. The admixture is then mixed and kneaded in a quasi-solid state wetted by a small quantity of water resulting on the surfaces of the small ice masses from the melting thereof into a macroscopically homogeneous system. Then, a transition of the system to a homogeneous mixture is caused gradually with the melting of the small ice masses. The mortar thus prepared is press molded with a pressure in excess of 30 kg/cm$^2$.

The mortar that is used in this method of press molding should have a water-cement ratio less than 45%. If the ratio is in excess of 45%, it is difficult to realize a sufficient mechanical strength of mortar. Besides, the composition has fluidity so that it is difficult to obtain the effectiveness of the press molding. A more preferred water-cement ratio range is 5 to 30% in the case of cement paste. In this range, a dense molding can be obtained through preparation of a homogeneous mixture and uniform pressure application. In the case of mortar obtained by adding sand to cement paste and concrete obtained by adding gravel to mortar, the workability is reduced, so that it is necessary to increase the watercement ratio compared to the cement paste. As an example, a suitable water-cement ratio is 15 to 40% in the case of mortar containing cement and sand in proportions of 1:2, while it is 25 to 45% in the case of concrete containing cement, sand and gravel in proportions of 1:2:2. Therefore, the mortar or the like used in this method has a water-cement ratio less than 45%.

Mortar having a usual order of watercement ratio has fluidity in the liquid state and leads to saturation of the compression effect when the molding pressure is increased to 10 to 20 kg/cm$^2$. However, the mortar which is used for the method of molding according to the present invention and which has a water-cement ratio less than 45% and substantially does not exhibit fluidity as liquid phase, will not reach saturation of the compression effect with a pressure of the order of 20 kg/cm$^2$. In the method of molding according to the present invention, the molding pressure should be less than 30 kg/cm$^2$. More specifically, the molding pressure is set according to the water-cement ratio of the mortar to obtain a dense molding. In other words, a low water-cement ratio less than 45% is set in a range, in which a dense molding free from defects is obtainable, according to the molding pressure applied. With mortar having a water-cement ratio less than 45%, water is not squeezed out or squeezed out not so much even if it is press molded with a high pressure close to the saturation pressure. That is, the pressure molding can be carried out under a condition substantially free from drain water.

With this method of molding, a high mechanical strength can be obtained owing to the combination of the effectiveness of the low water-cement ratio due to small ice masses and the effectiveness of compaction in high pressure molding. In addition, since the press molding is carried out under a condition substantially free from drain water, the molding obtained is free from defects due to drain water. Also, the molding is free from the deterioration of the dimensional accuracy such as thickness irregularities due to lack of balance of pressure applied during the press molding.

According to the present invention, mortar is prepared and transported as follows. Small ice masses are added to cement or a mixture of cement, aggregate, etc. The admixture is then mixed and kneaded in a quasi-solid state wetted by a small quantity of water resulting on the surfaces of the small ice masses from the melting thereof into a macroscopically homogeneous system. The mortar prepared in this way is transported in a heat insulated space or a cooled space. In this way, the mortar can be transported for long periods of time or for a long distance while suppressing the progress of the hydration reaction.

In this method of transportation, small ice masses are used in lieu of water and are mixed and kneaded with cement or a mixture consisting of cement aggregate, etc. in the quasi-solid state to obtain mortar. The small ice masses come to carry particles of cement or cement and aggregate attached to their surfaces so that it assumes a state of masses covered by cement or cement/aggregate particles. As these covered small ice masses are dispersed, a system is formed, which is macroscopically homogeneous although it is microscopically not homogeneous. The mortar thus prepared has a low temperature and initially contains small amount of liberated water resulting from the melting of the small ice masses. Therefore, its hydration reaction proceeds very slowly compared to mortar which is prepared conventionally using water. In addition, small ice masses covered by cement or cement/aggregate particles are effectively covered by a heat insulation layer, so that they are less easily melted, that is, they can suppress liberation of water and contributes to the suppression of the hydration reaction.

The mortar or the like prepared in this way is transported in a heat-insulated space, e.g., a heat-insulated drum of a truck mixer which is covered by a heat-insulating material. Or it is transported in a cooled space, e.g., a truck mixer drum which is cooled by a cooler.

Since the mortar is prepared under a low temperature condition, it contains less liberated water compared to the case where the mixing and kneading are done using water. In addition, it is accommodated in a heat-insulated or cooled space as it is transported. Thus, its temperature rise and melting of the small ice masses are suppressed to suppress the progress of hydration reaction. It can thus withstand a long-time or long-distance transportation.

With this method, the mortar can be transported to a desired site for charging or laying. The small ice masses are melted either naturally or by applying heat-and/or pressure. Water resulting from the melting wets the surrounding cement and/or aggregate to form homogeneous mortar or the like. With temperature rise of the mortar, the hydration reaction of cement proceeds so that solidification can be obtained.

The period of melting of ice greatly depends on the temperature and grain size of the small ice masses. That is, the time until the commencement of the hydration reaction of raw mortar can be controlled by appropriately selecting the temperature and grain size of the small ice masses. It is possible to sieve ice masses to obtain ice masses having a predetermined grain size, if desired. As the small ice masses, crushed ice masses at a predetermined temperature may be used. Alternatively, small ice masses may be deep cooled to a predetermined temperature for use. Further, it is possible to cool cement, aggregate, etc. in advance to the preparation of mortar.

In the method of transportation according to the present invention, it is preferable to supply the total quantity of water necessary for the hydration reaction of cement in the form of small ice masses. Usually, however, sand or other aggregate contains a certain amount of water, so that the necessary amount of water except for the water content in these materials is supplied as small ice masses.

In the method of transportation according to the present invention, it is possible to suppress the hydration reaction of mortar under transportation and retard the period until the instant of its charging. It is thus possible to permit extension of the supply area covered by the raw concrete plant or like raw mortar preparation/supply plant to improve workability and also increase the efficiency of the works of charging mortar in remote sites.

According to the present invention, mortar or like cement-containing composition is prepared and used for civil works as follows. This will now be described in conjunction with an example of the present invention applied to the erection of a compaction pile. Cement, aggregate, etc. are mixed and kneaded together with small ice masses in a quasi-solid state wetted by a small quantity of water resulting on the surfaces of the small ice masses from the melting thereof into a macroscopically homogeneous system. The slurry thus prepared is then charged as the material of pile into an outer pipe. The outer pipe then is driven to a predetermined depth into ground. Then, the material is forced into the ground and compacted using an inner pipe while raising the outer pipe. This compacted material is solidified through hydration reaction of the cement and water resulting from the melting of the small ice masses, whereby the compaction pile is obtained.

In this process, the material is obtained by incorporating cement powder and solid phase small ice masses into sand. However, the forcing of the material into the ground and compacting it can be carried out substantially in the same way as in the case of the material consisting of the solitary sand. After the compaction, the small ice masses are melted to cause hydration reaction of cement and solidification thereof with sand into a mortar pile. This pile has a higher mechanical strength than a sand pile has and is less liable to be carried away along with underwater. Further, since the water necessary for the hydration reaction is provided as small ice masses, it is possible to obtain a homogeneous material with reduced water-cement ratio.

Further, the present invention is applicable to the erection of a site-charged concrete pile. That is, the concrete pile can be produced by using coarse aggregate, e.g., gravel, in lieu of fine aggregate, e.g., said. Again in this case, the fine aggregate, coarse aggregate and cement are mixed together into a sufficiently homogeneous mixture and reliably driven into the ground to obtain a dense and homogeneous concrete pile.

DESCRIPTION OF EXAMPLES

The present invention will be described in detail in connection with the following examples.

EXAMPLE A-1

Purpose

A first characteristic of the method of production of a cement-containing composition using small ice masses in lieu of water according to the present invention is the kneading performance. However, it is extremly difficult to directly and quantatively evaluate the kneading performance. Accordingly, in this Example A-1 the performance is evaluated indirectly on a macroscopic basis. More specifically, mechanical strength characteristics of cement pastes prepared with the water-cement ratio in a very low range were examined.

Method

As small ice masses those which passed through a 0.6-mm sieve were used. Small ice masses and cement were held at a low temperature of approximately $-20°$ C. in a freezing chamber until the start of kneading. Small ice masses and cement were mixed together in water-cement ratios of 4% and 7.5%. The individual compositions were kneaded at room temperature of 20° C. using a mortar mixer. After the ice masses had been completely melted, the system was charged into a mold for press molding. The press molding was performed for a short period of time (i.e., for approximately 5 minutes from the instant of pressure application till the release of load) with a pressure of 1,000 kg/cm² to obtain cement paste molding samples with dimensions of 4 cm by 4 cm (direction of pressure application) by 16 cm. Bending strength tests and compression strength tests were done after four weeks of curing in the sealed state.

Results

| water-cement ratio | 4% | 7.5% |
| --- | --- | --- |
| Bending strength | 139 kg/cm² | 225 kg/cm² |
| Compression strength | 576 kg/cm² | 1005 kg/cm² |

Consideration

Cement pastes with superlow water-cement ratios of 4% and 7.5% could be prepared, and their solidified samples exhibited considerably high bending strength and compression strength. From these two points, the homogeneity of the low water-cement ratio cement-containing composition prepared by the method according to the present invention could be confirmed, although indirectly.

[EXAMPLE A-2

Purpose

Separation of aggregate was examined by preparing cement pastes using as aggregate steel balls which are greatly different in specific gravity from cement in order to obtain a great tendency of separation of the aggregate.

Method

A cement paste having a composition consisting of water, cement and steel balls (3 mm in diameter) in proportions of 0.2:1.0:1.0 (by weight) was prepared with the steel balls as aggregate for a model experiment for the separation of the aggregate.

Figure 1:
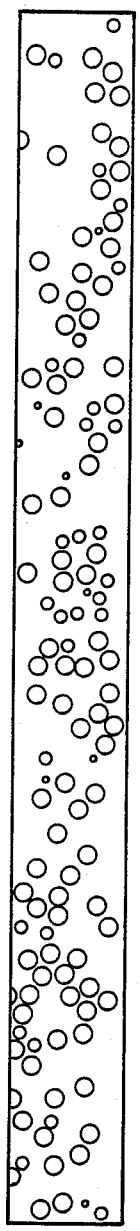
FIGS. 1 to 3 are views showing longitudinal sections of solidified materials in Example A-2 and contrast Examples 1 and 2, respectively, showing the dispersion of steel balls.

The above composition with small ice pieces used in lieu of water was kneaded at a room temperature of 15° C. and in the quasi-solid state and was then charged in this state into a vertical cylindrical mold (50 mm φ in diameter). The composition was then vibrated for 30 seconds with a rod-like vibrator (12 mm φ in diameter) inserted into the end of the mold. After the ice masses had been completely melted, the composition was compacted with application of a force of approximately 20 kg from above for solidification. A central portion (20 mm wide) of the solidified sample was cut in the longitudinal direction, and the distribution of steel balls in the cutting surface was examined (see FIG. 1).

CONTRAST EXAMPLE 1

Figure 2:
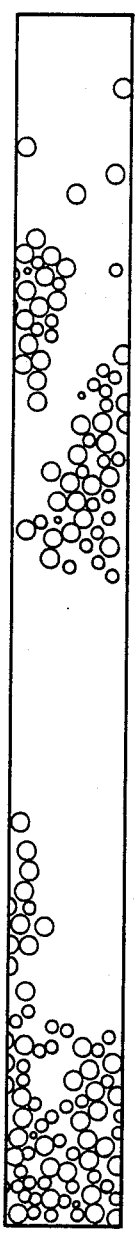

The same composition as in Example A-2 was kneaded under the same condition except for that the temperature was set to −20° C. before the 30 second application of vibrations. That is, the composition was kneaded in a state very close to the solid phase and was then charged into the mold and vibrated. A central portion (20 mm wide) of the solidified sample was cut in the longitudinal direction, and the distribution of steel balls in the cutting surface was examined (see FIG. 2)

CONTRAST EXAMPLE 2

Figure 3:
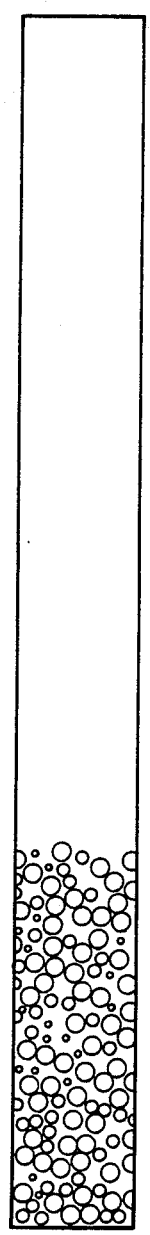

Kneading, charging and compacting were done under the same conditions as in Example A-2 except for that double the quantity of water was used, i.e., the water-cement ratio was set to 0.4, and added as such. A central portion (20 mm wide) of the solidified sample was cut in the longitudinal direction, and the distribution of steel balls in the cutting surface was examined (see FIG. 3).

Consideration

It was found that in order to obtain uniform mixing and dispersion and eliminate separation, it is effective to let the ice masses partly melted to provide the quasi-solid state and adequate viscosity.

EXAMPLE A-3

Purpose

Temperature changes of cement paste with time after kneading was examined to study the speed of hydration reaction between cement and water.

Method 1

Figure 4:
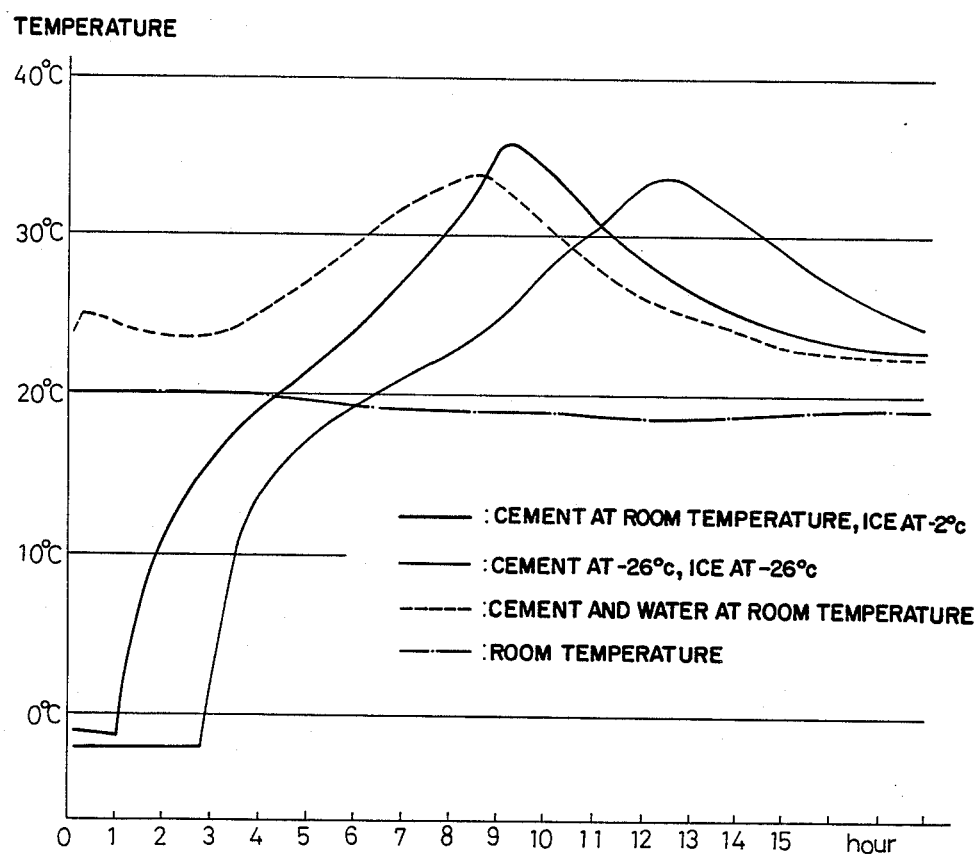
FIGS. 4 to 6 are graphs showing temperature versus elapsed time relations obtained with Methods 1 to 3, respectively, in Example A-3.

A mixture consisting of water and cement in proportions of 0.3:1.0 was kneaded for approximately 3 minutes to prepare a cement paste, which was then charged into a box made from laminated plate (9 mm thick) and having inner dimensions of 7 cm by 7 cm by 14 cm (height). The temperature at the center of the interior of the box was measured using a thermocouple. FIG. 4 shows the relation between the temperature of the charged cement paste and elapsed time with the temperature of water or ice masses and cement before mixing taken as a third parameter.

Method 2

Figure 5:
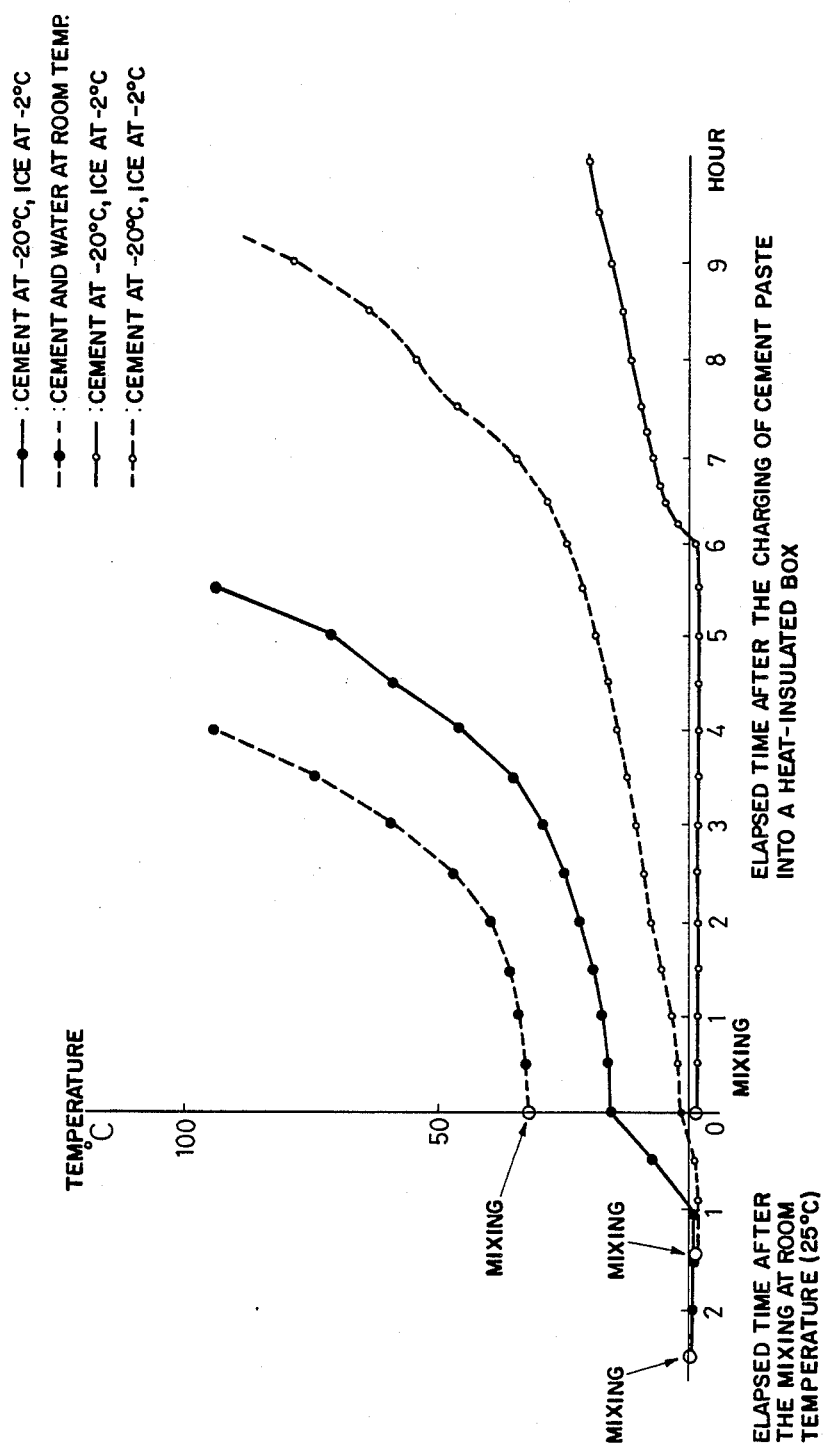

The cement paste prepared in Method 1 was charged into a heat-insulated box made from foamed polystyrene plate 30 mm thick, the box having inner dimensions of 10 cm by 10 cm by 10 cm. The temperature of the center of the interior of the box was measured using a thermocouple. FIG. 5 shows the relation between the temperature of the charged cement paste and elapsed time with the temperatures of water or ice and cement before mixing taken as a third parameter. Influence of leaving the cement paste at room temperature after the kneading was also examined.

Method

Figure 6:
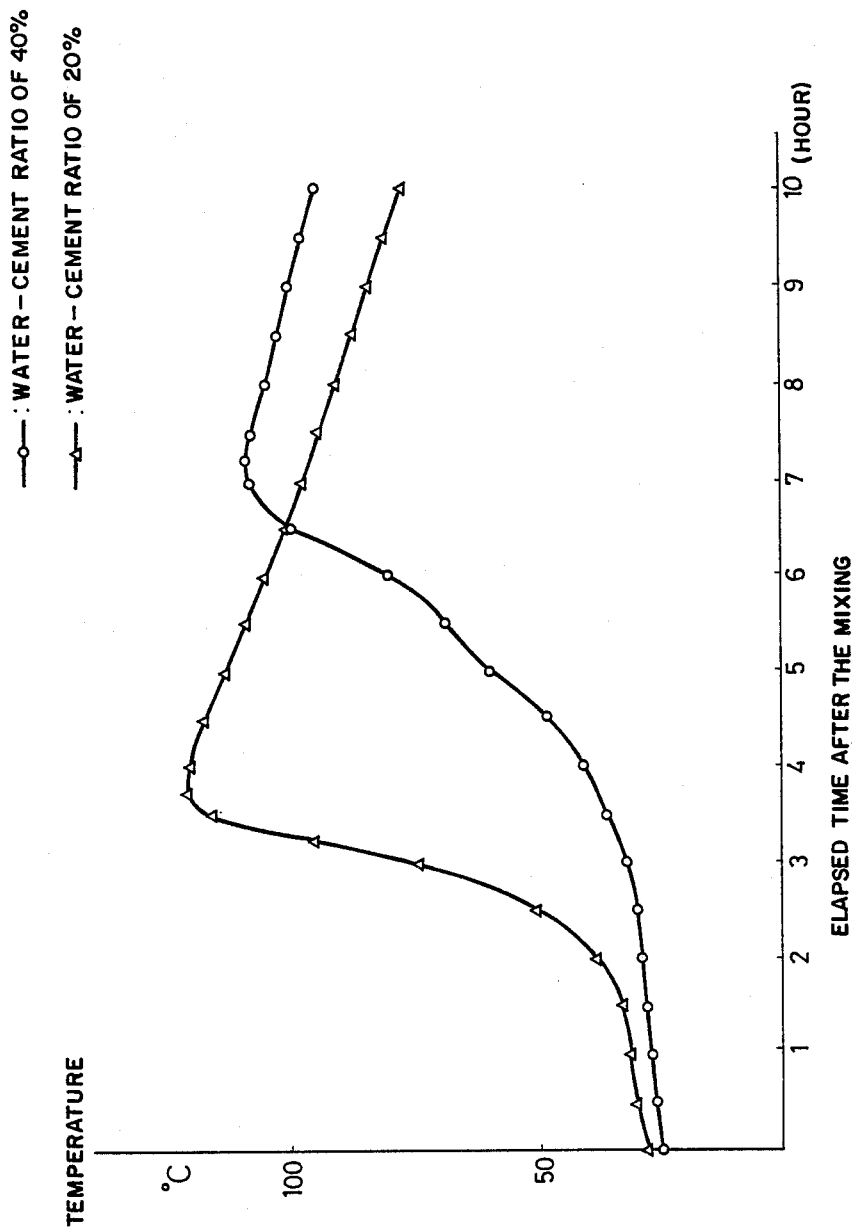

Cement pastes with water-cement ratios of 0.2 and 0.4 were prepared using cement and water at room temperature. Each cement paste was charged into a heat-insulated box made from foamed polystyrene plate 30 mm thick, the boxhhaving inner dimensions of 10 cm by 10 cm by 10 cm. The temperature of the center of the interior of the box was measured. FIG. 6 shows the relation between the cement paste temperature and time elapsed after charging.

Consideration

FIG. 4 shows that with the method according to the present invention the hydration reaction can be retarded considerably by reducing the temperature of material at the time of kneading. FIG. 5 shows that the hydration reaction can be retarded at reduced temperatures and can be controlled by means of heat insulation.

FIG. 6 shows that the hydration reaction proceeds more quickly for a lower water-cement ratio.

EXAMPLE A-4

Purpose

The purpose was to study the shape and form of small ice masses that can be used in the method according to the present invention. Accordingly, small ice masses were produced at a room temperature of 15 to 20° C. using an ice slicer and were used to prepare cement paste and mortar for mechanical strength tests. More specifically, in this example the influence of a slight quantity of water film which was already present on the sliced small ice mass surfaces and adverse effects of the use of ice masses on the solidified material were examined.

Method

Cement paste and mortar samples having different water-cement ratios were prepared using small ice masses obtained by crushing ice with an ice slicer, cement (at a room temperature of 15° to 20° C.) and river sand (2.5 mm or below in grain size, dry on surface, double the quantity of cement). After the ice masses had been completely melted, these cement paste and mortar were each densely charged by hand compaction into a mold of 4 cm by 4 cm by 16 cm for curing in a sealed state for four weeks to obtain solidified sample. The bending strength and compression strength of the sample were measured.

Results

Figure 7:
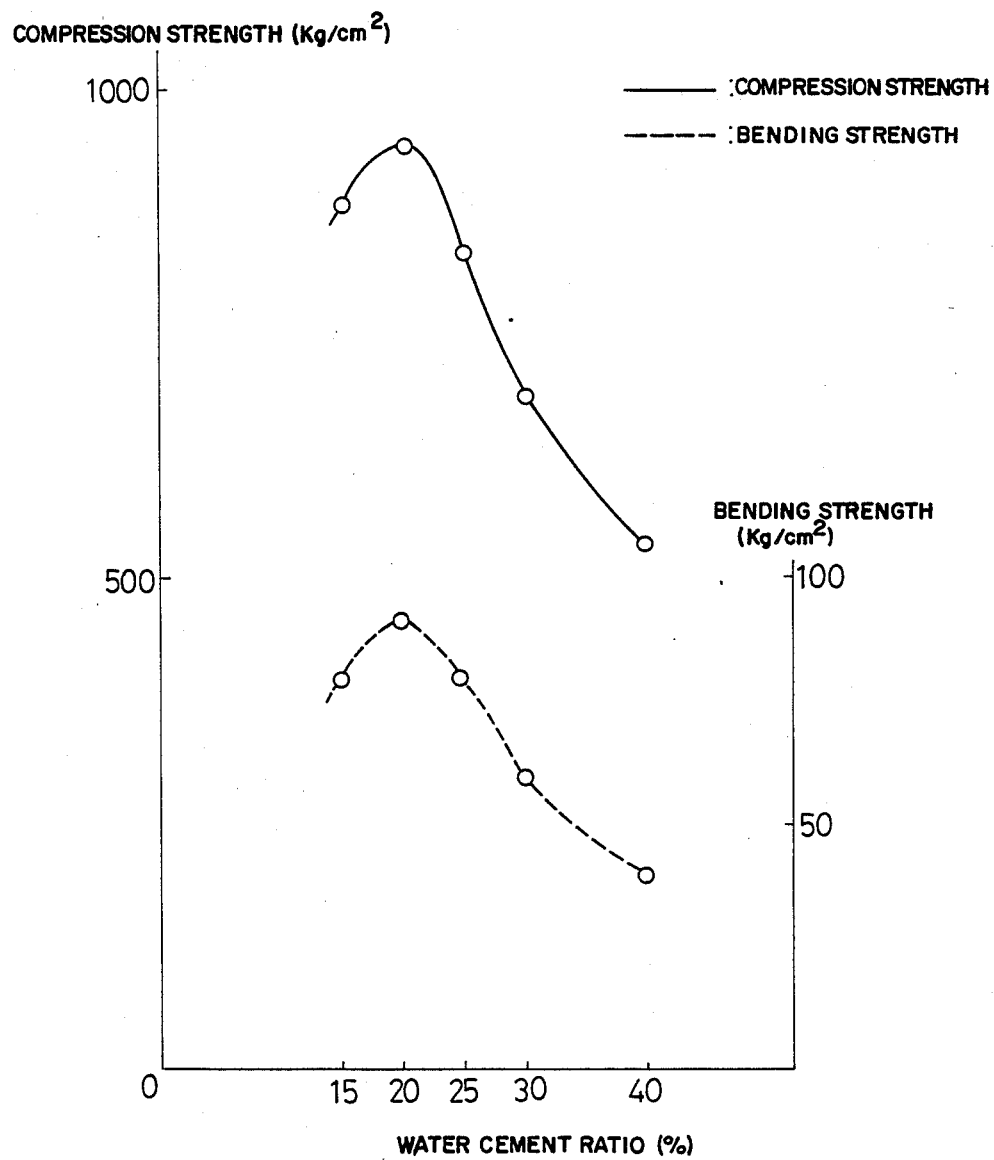
FIGS. 7 and 8 are graphs showing the compression strength versus water-cement ratio relations of cement paste and mortar, respectively, in Example A-4.
Figure 8:
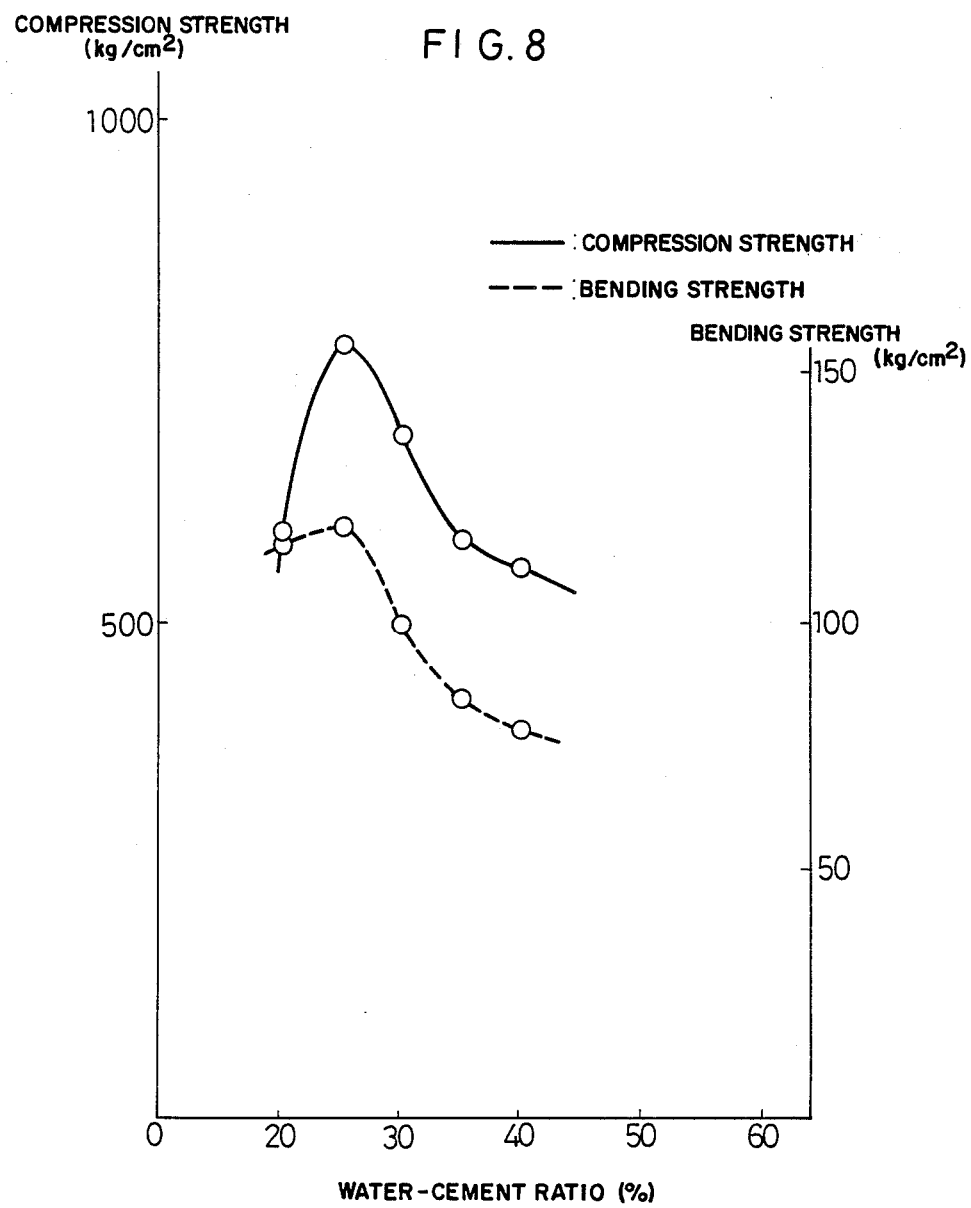

FIGS. 7 and 8 show mechanical strength of the cement paste and mortar samples, respectively.

Consideration

In the low water-cement ratio range around 20%, the kneading and charging were extremely difficult. Therefore, quantitative study for this range can not be made. However, it can be seen from FIGS. 7 and 8 that considerable mechanical strength can be obtained in a low water-cement ratio range around 20% in the case of the cement paste and around 25% in the case of the mortar. For this reason, the following can be concluded:

(a) The scope of shapes and forms of the small ice masses that can be practically used is considerably broad, and small ice masses obtained using an ice slicer can sufficiently meet the end.

(b) There are no adverse effects of the use of small ice masses for mixing and kneading.

EXAMPLE A-5

Purpose

A great quantity of low water-cement ratio range concrete, which had hitherto been considered to be practically impossible, was prepared by the method according to the present invention, and using this concrete a reinforced concrete structure model on the actual scale was constructed. Samples were cut out from several different portions of this model and used for compression tests, whereby the method was evaluated.

Method

Concrete was charged by forming a frame having a size close to that of an actual reinforced concrete structure, with a height of 275 cm, a sectional area of pillar of 40 cm by 40 cm, a sectional area of beam of 30 cm by 60 cm, a slab thickness of 12 cm and a wall thickness of 12 cm and setting reinforcing iron bars substantially in the same manner as for the actual reinforced concrete structure.

The concrete consisted of ice, cement, sand (5 mm in maximum grain size, dry on surface) and gravel (25 mm in maximum grain size, dry on surface) was in proportions by weight of 0.3:1.0:1.5:1.5.

The small ice masses used were obtained by producing ice pieces using an ice slicer, preserving these ice pieces in a freezing chamber at approximately $-10°$ C. and crushing again immediately before use. The composition was kneaded in the plurality of steps using a forced kneading type mixer. The concrete prepared in this way was carefully charged into the frame using a rod-like vibrator. One week after the charging, the frame was removed, and the concrete was cured in air (Tokyo, summer). When 28 days were passed since the charging, seven test pieces 10 cm in diameter by 20 cm in height were cut out from lower, intermediate and upper pillar portions and beam, and compression tests on these test pieces were done.

Results

Concrete with as low a water-cement ratio as 30% could be charged very densely. The compression strength of the seven test pieces ranged from 611 to 713 kg/cm$^2$, the average value being 662 kg/cm$^2$.

Consideration

The concrete prepared, with water, cement, sand and gravel in proportions by weight of 0.3:1.0:1.5:1.5, contained less sand and gravel, i.e., contained much cement. However, it was possible to very densely charge the low water-cement ratio concrete, the charging of which had hitherto been considered to be substantially impossible without any additive. According to the present invention this could be done owing to the fact that the kneading can be facilitated by using small ice masses and the fact that the hydration reaction can be retarded to permit sufficient time to be available for compaction.

The fact that the compression strength of the test pieces taken out from various parts of the solidified concrete ranges from 611 to 713 kg/cm$^2$ indicates that very dense, high quality concrete charging could be obtained.

EXAMPLE B]

Purpose

An experiment in case of using, in lieu of water, small ice masses prepared by dissolving a water-soluble polymer in water and freezing the resultant solution, was conducted as follows.

Method

The composition consisted of 1,000 g of cement, 300 g of crushed small in pieces of an aqueous solution containing 1.96% of methylcellulose (at $-2°$ C.), 450 g of water, 10 g of methylcellulose ("Shinetsukagaku High Methollose"), and 10 g of an aqueous solution containing 0.5 % of NaOH. Water-cement ratio was 29%. Methylcellulose-to-cement ratio was 0.588%. The crushed small ice pieces were prepared by freezing the aqueous solution noted above and crushing the ice using an ice slicer.

The composition was mixed and kneaded using a mortar mixer into a cement milk.

Result

Figure 9:
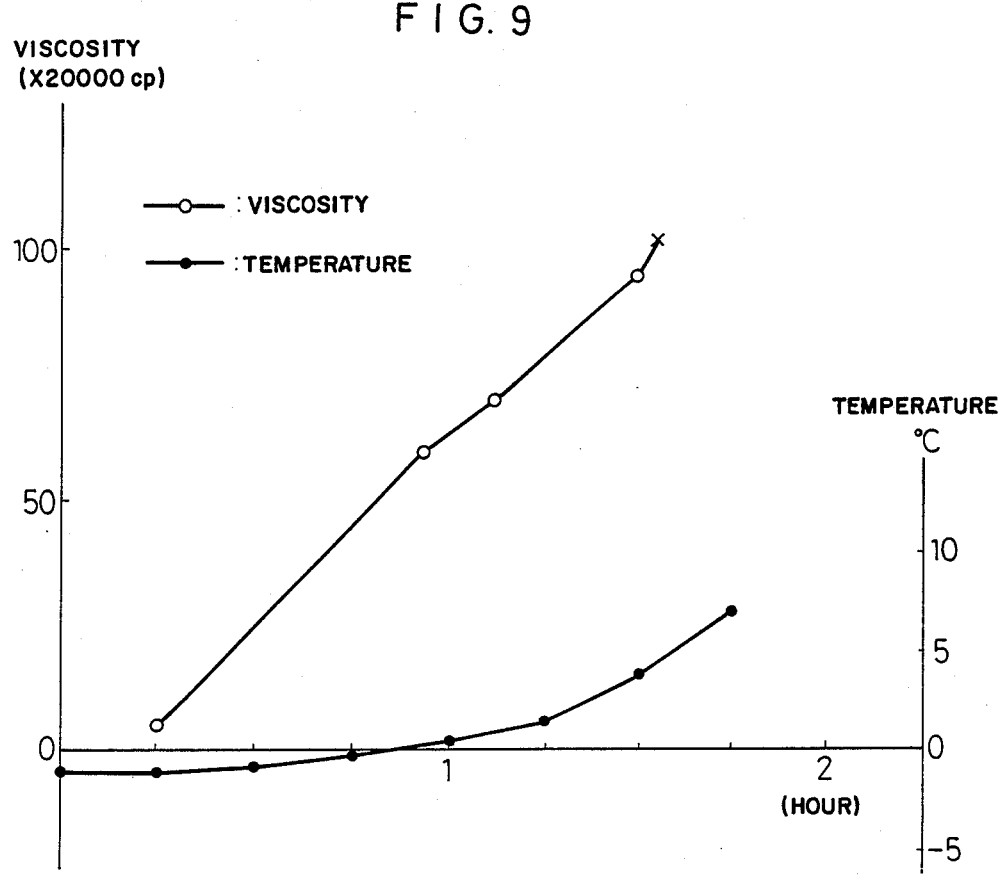
FIG. 9 is a graph showing the temperature and viscosity versus elapsed time relations of cement milk in Example B.
Figure 10:
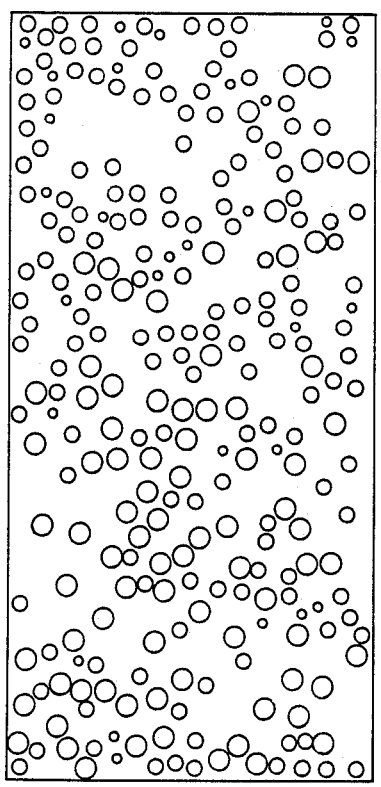
FIGS. 10 to 14 are sections showing the dispersion of steel balls of split surface of samples of solidified materials with water-cement ratios of 35%, 40%, 45%, 50% and 55%, respectively, in Example C.
Figure 11:
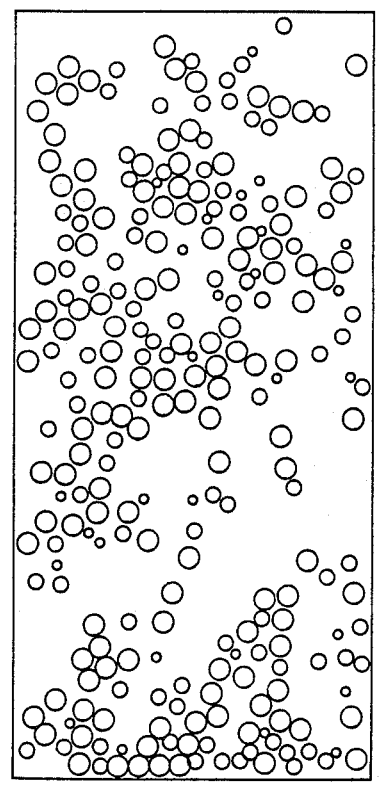
Figure 12:
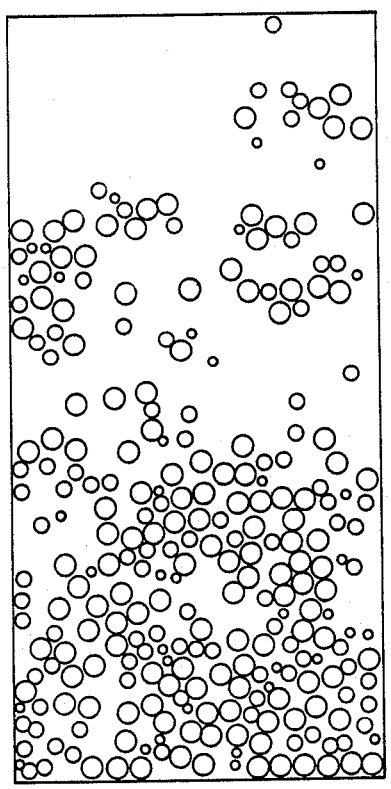
Figure 13:
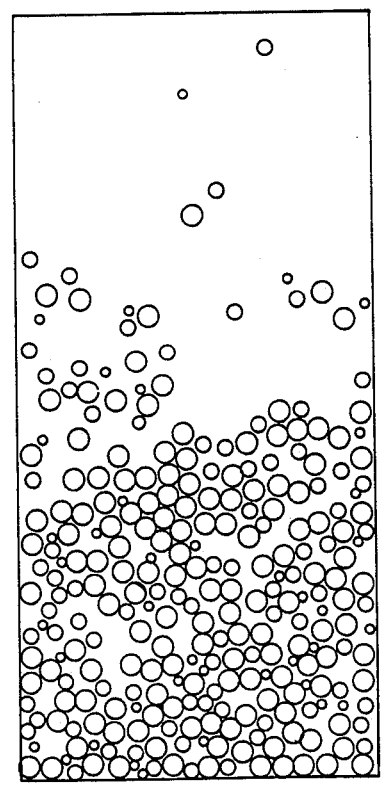

During kneading no viscosity increases due to methylcellulose took place, and a homogeneous cement milk could be readily obtained. After the kneading, the viscosity of the composition extremely increased with temperature rise as shown in FIG. 9. The viscosity was measured 3 minutes after the start of rotation of a rotor No. 7 of "Type B Viscosity Gauge" by Tokyo Keiki at 2 rpm. Labeled X in the Figure is a point, at which the viscosity was too high to be measured.

This method of preparation is free from the difficulty of agitation and kneading of the cement-water composition due to high viscosity thereof but permits a homogeneous mixture to be readily obtained with incorporation of a water-soluble polymer. In addition, it permits reducing the water-cement ratio of the composition and improving the mechanical strength of the material by using ice pieces in lieu of water.

EXAMPLE C

Purpose

A model experiment was conducted for confirming the dispersion of coarse aggregate in heavy concrete containing high specific gravity coarse aggregate during transportation, charging and compaction.

Method

Steel balls 3 mm $\phi$ in diameter were used as high specific gravity coarse aggregate, and heavy concrete containing cement, sand and steel balls in proportions of 1:2:3 (by weight) was prepared using small ice masses in lieu of water. The sand was river sand 2.5 mm or below in grain size and was dry on surface when used.

Five different compositions were prepared by setting the water-cement ratio to 35%, 40%, 45%, 50% and 55%, respectively. First, cement, sand and small ice masses were mixed and kneaded together. After the small ice masses were melted, steel balls were added, and the admixture was further kneaded. This heavy concrete was charged into a mold 5 cm in diameter by 10 cm in height and compacted by giving vibrations from the outside of the mold for 30 seconds using a vibrator. Then, after effecting a simple surface finish the concrete was solidified to obtain sample. A central portion of the sample was split longitudinally, and the degree of dispersion of steel balls on the split surface was examined.

Results

FIGS. 10 to 14 show the split surfaces of the samples with the water-cement ratios of 35%, 40%, 45%, 50% and 55%, respectively.

Consideration

In this method of preparation of heavy concrete, the kneading should be done in a considerably hard state with a low water-cement ratio in order to obtain uniform dispersing of the high specific gravity coarse aggregate without separation thereof.

By using small ice masses in lieu of water and setting the water-cement ratio to be less than 45%, the following is possible. (1) A high homogeneity concrete slurry can be prepared even with a low water-cement ratio. (2) The concrete slurry obtained has high viscosity so that separation of coarse aggregate at the time of charging is less liable to result. (3) Workability can be maintained with kneading and preparing at a low temperature and suppression of the hydration reaction with redundancy until the charging. (4) The concrete material can be imparted with high mechanical strength owing to the low water-cement ratio.

With this method of preparation it is thus possible to obtain high homogeneity and high mechanical strength concrete with less possibility of separation of the high specific gravity coarse aggregate.

EXAMPLE D

The following experiment was conducted on mortar or the like using small ice masses under a low temperature condition according to the present invention.

Purpose

Influence of freezing in an initial stage after preparation was examined.

Method (a) Cement paste samples having different water-cement ratios were prepared using small ice masses. When small ice masses were completely melted, the paste was charged into a steel mold with inner dimensions of 4 cm by 4 cm by 16 cm (height). Immediately after the charging and also after 4 hours of curing in a room at 15° C. subsequent to the charging, the concrete was held for 24 hours in a freezing chamber at −20° C. to completely freeze. Thereafter, the concrete was cured again in the room at 15° C. for 28 days to obtain sample. The mechanical strength ratio of the sample to concrete that was cured at 15° C. for 28 days without causing freezing was determined.

(b) Cement mortar samples consisting of cement paste and river sand (25 mm or below in grain size, dry on surface) in proportions of 1.0:2.0 and having different water-cement ratios were prepared using small ice masses. When the small ice masses were completely melted, each sample concrete was charged into a steel mold 5 cm in diameter by 10 cm in height. Subsequent to the charging, the concrete was held in a freezing chamber at −20° C. for 24 hours to freeze completely. Afterwards, the concrete was cured in a high temperature room at 40° C. for 7 days to obtain sample. The mechanical strength ratio of the sample to concrete that was cured at 40° C. for 7 days without causing freezing was determined. In both the methods (a) and (b) the curing is done in the sealed state.

Results

Figure 15:
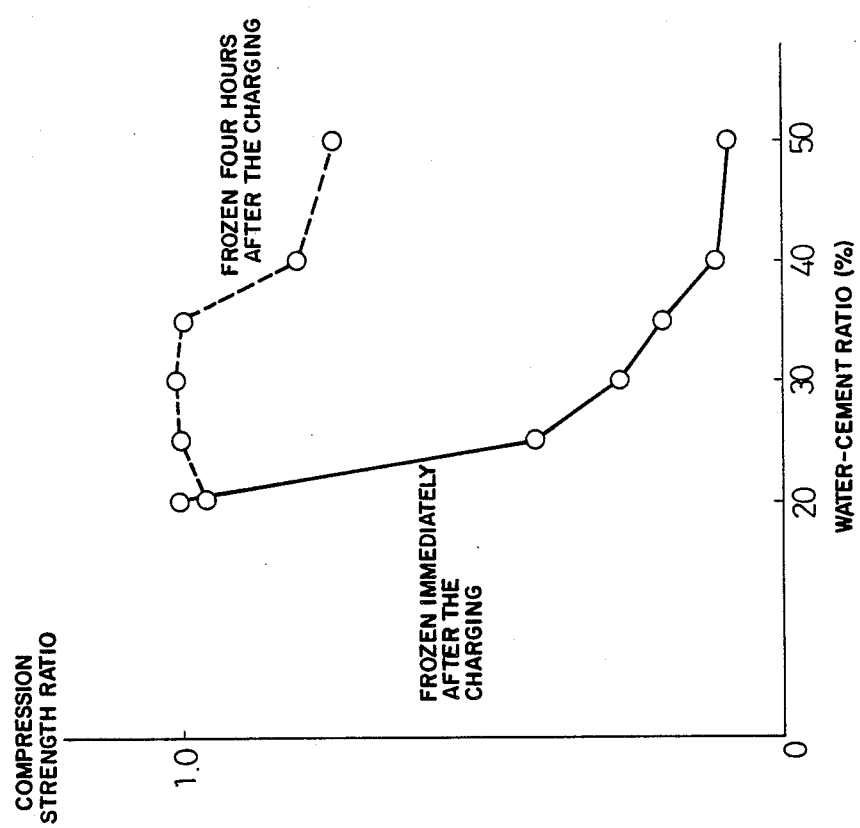
FIGS. 15 and 16 are graphs showing the compression strength ratio versus water-cement ratio ralations of cement paste and cement mortar samples, respectively, in Example D.
Figure 14:
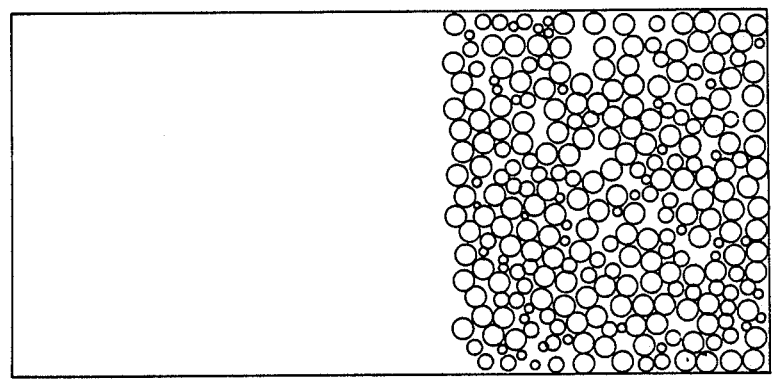
Figure 16:
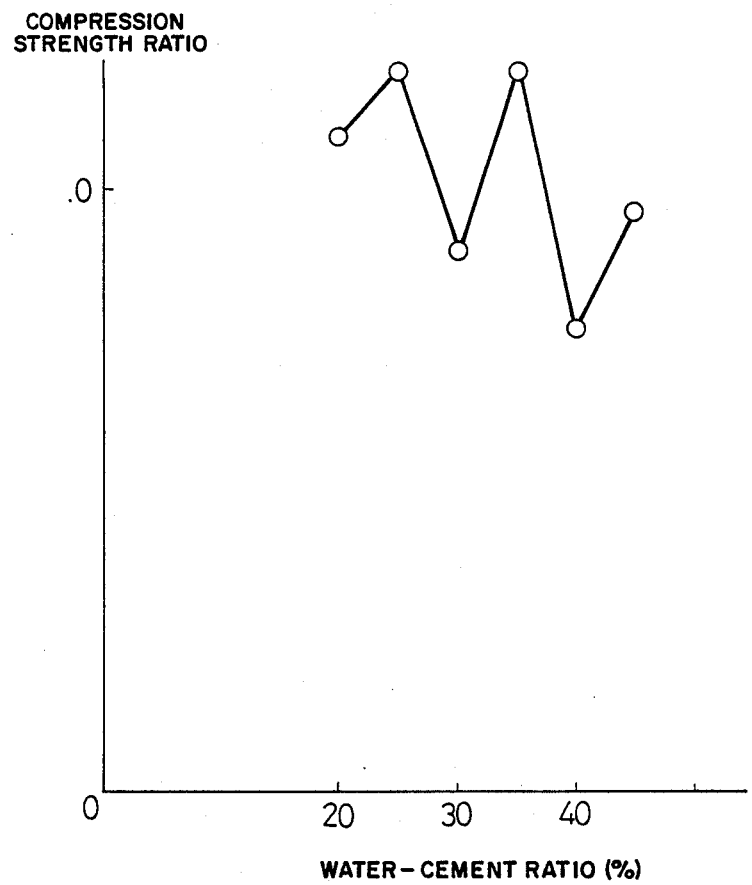

Compression strength ratio of cement paste and cement paste mortar samples:

FIGS. 15 and 16 show the compression strength ratio of sample subjected to freezing to sample not subjected to freezing.

Consideration

In the case of cement paste shown in FIG. 15, the sooner the occurrence of freezing, the more pronounced the adverse effects thereof. There are no adverse effects when the water-cement ratio is low.

In the case of cement mortar shown in FIG. 16, pronounced adverse effects could not be recognized with samples which were frozen immediately after the charging so long as the water-cement ratio was less than 45%. In the case of mortar, unlike the case of cement paste, the adverse effects of freezing are alleviated even with a high water-cement ratio because the amount of water per unit volume is low even in this case With the method according to the present invention it is possible to prepare a cement-containing composition with a low water-cement ratio to be less than 45% and high homogeneity and eliminate or reduce adverse effects of freezing at the time of the charging. Also, satisfactory workability can be maintained, and the charging can be done smoothly.

EXAMPLE E

Purpose

To confirm kneading property of composition containing reinforcement fiber, kneading tests were conducted using carbon fiber, which was thought to be extremely difficult to uniformly disperse when it was incorporated about 2.0% in weight ratio to cement.

Method

Carbon fiber 10 mm in average length, while cement and water were ssed as materials in proportions of 3:100:30 (by weight).

The carbon fiber was added to water for freezing to obtain ice mass, which was then sliced to obtain small ice masses containing carbon fiber. These small ice masses were added to cement, and the mixture was kneaded using a mortar mixer.

(a) Solidified material (Sample A) 5 cm in diameter by 10 cm in height was obtained using cement milk prepared by kneading for 30 seconds.

(b) Solidified material (Sample B) having the same dimensions was obtained usnng cement milk prepared by kneading for 30 seconds and further kneading for 30 seconds after the complete melting of the ice masses.

(c) Solidified material (Sample C) having the same dimensions was obtained using cement milk prepared by further kneading the cement milk for 30 seconds in (b).

Results

The state of dispersion of fiber in Samples A to C by cutting a central portion thereof. With Sample A small masses of fiber are noted in various parts. With Sample B there were fiber masses which were small in size and uniformly distributed. With Sample C, the dispersion of fiber proceeded further so that a practically homogeneous dispersion substantially free from fiber masses could be observed.

Consideration

By using sliced fiber-containing ice masses, the fiber is dispersed primarily, i.e., as small fiber masses through the mixing and kneading of the composition. Subsequent to the melting of the small ice masses, further kneading is carried out in a state where the mixture of cement and water has an adequate viscosity and small fiber masses become disentangled within an extremely short period of time so that the fiber is uniformly dispersed in the cement milk.

A quantity of carbon fiber which has hitherto been thought to be extremely difficult to disperse uniformly, can be dispersed to obtain Sample C, which is substantially free from small fiber masses, by the procedure shown above in the "Method".

More specifically, this method permits the following. (1) Entangling or cutting of the incorporated reinforcement fiber is less liable to occur, so that the mechanical strength of the fiber can efficiently promote the mechanical strength of the solidified material. (2) It is possible to reinforce the mechanical strength of solidified material obtained from a low water-cement ratio cement-containing composition. (3) It is possible to obtain a fiber-reinforced cement-containing solidified material having high mechanical strength.

EXAMPLE F-1

Mortar prepared from the following composition was press molded in a pressurizable and drainable mold.

The composition consisted of small ice masses, cement and river sand (2.5 mm or below in grain size, dry on surface) in proportions of 0.25:1.0:2.0 by weight.

The molding pressure was 1,000 kg/cm$^2$. Only a very small quantity of water was squeezed out, i.e., substantially no water was drained. After 7-days, the mechanical strength of the molding was tested. The bending strength and compression strength were 116 kg/cm$^2$ and 730 kg/cm$^2$, respectively.

EXAMPLE F-2

Cement paste prepared from the following composition was press molded in a pressurizable and drainable mold.

The composition consisted of small ice masses and cement in proportions of 0.20:1.0.

The molding pressure was 840 kg/cm$^2$. Only a very small quantity of water was squeezed out, i.e., substantially no water was drained. As the 28-day mechanical strength of the molding thus obtained, the bending strength and compression strength were 254 kg/cm$^2$ and 1,446 kg/cm$^2$, respectively. High mechanical strength molding could be obtained by super-high pressure press molding.

EXAMPLE F-3

Cement mortar prepared from the following composition was press molded in a pressurizable and drainable mold.

The composition consisted of small ice masses, cement and river sand (2.5 mm or below in grain size, dry on surface) in proportions of 0.25:1.0:2.0 by weight.

The molding pressure was 300 kg/cm$^2$. No water was drained. As the 7-day mechanical strength of the molding thus obtained, the bending strength and compression strength were 99 kg/cm$^2$ and 704 kg/cm$^2$, respectively.

EXAMPLE F-4

Super low water-cement ratio cement paste prepared from the following composition was molded in a pressurizable and drainable mold.

The composition consisted of small ice masses and cement in proportions of 1 2 and in weight ratio of 0.40:1.0 and 0.075:1.0.

The small ice masses were those having been passed through a 0.6-mm sieve and at $-20°$ C. These small ice masses were prepared by deep freezing crushed ice pieces obtained using an ice slicer in a freezing chamber at $-20°$ C., then crushing the resultant ice again and sieving the crushed ice pieces. The cement was deep cooled and at $-20°$ C. when used.

The molding pressure was 1.000 kg/cm$^2$. The molding was done without draining any water. As the 28-day mechanical strength of the molding thus obtained, the bending strength was 139 and 255 kg/cm$^2$, and the compression strength was 567 and 1,005 kg/cm$^2$.

From Examples F-1 to F-4, the following can be considered.

The mortar or the like prepared using small ice masses and kneading in the quasi-solid state, has high homogeneity even with a low water-cement ratio and permits obtaining a dense molding free from interstices by press molding. Thus, the mechanical strength which is inherent to the low water-cement ratio mortar can be realized in the molding. In addition, reduction of the dimensional accuracy such as thickness irregularities does not result from the press molding.

EXAMPLE G

Regarding the effectivensss of utility of small ice masses in the transportion of mortar, the following experiment was conducted.

Figure 17:
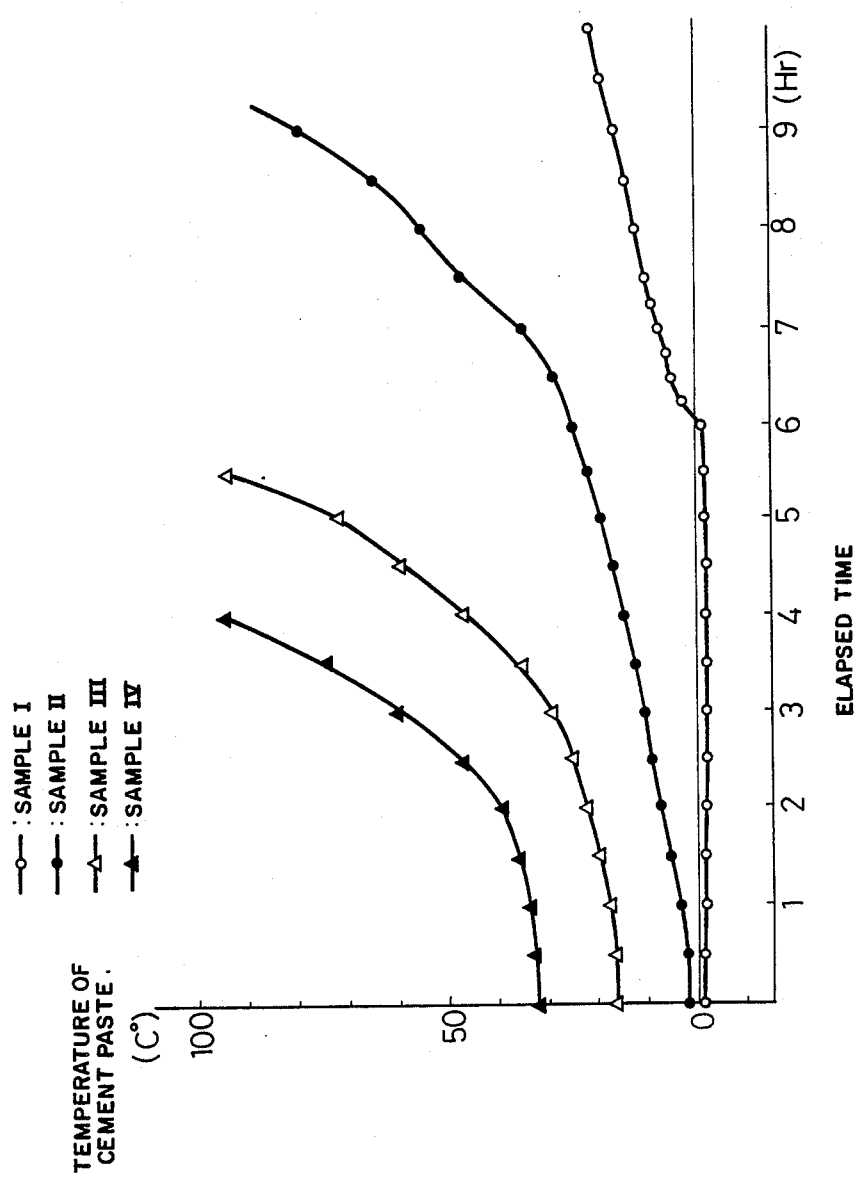
FIG. 17 is a graph showing the temperature versus elapsed time relations of cement pastes in Example G.
Figures 18, 19, 20, 21:
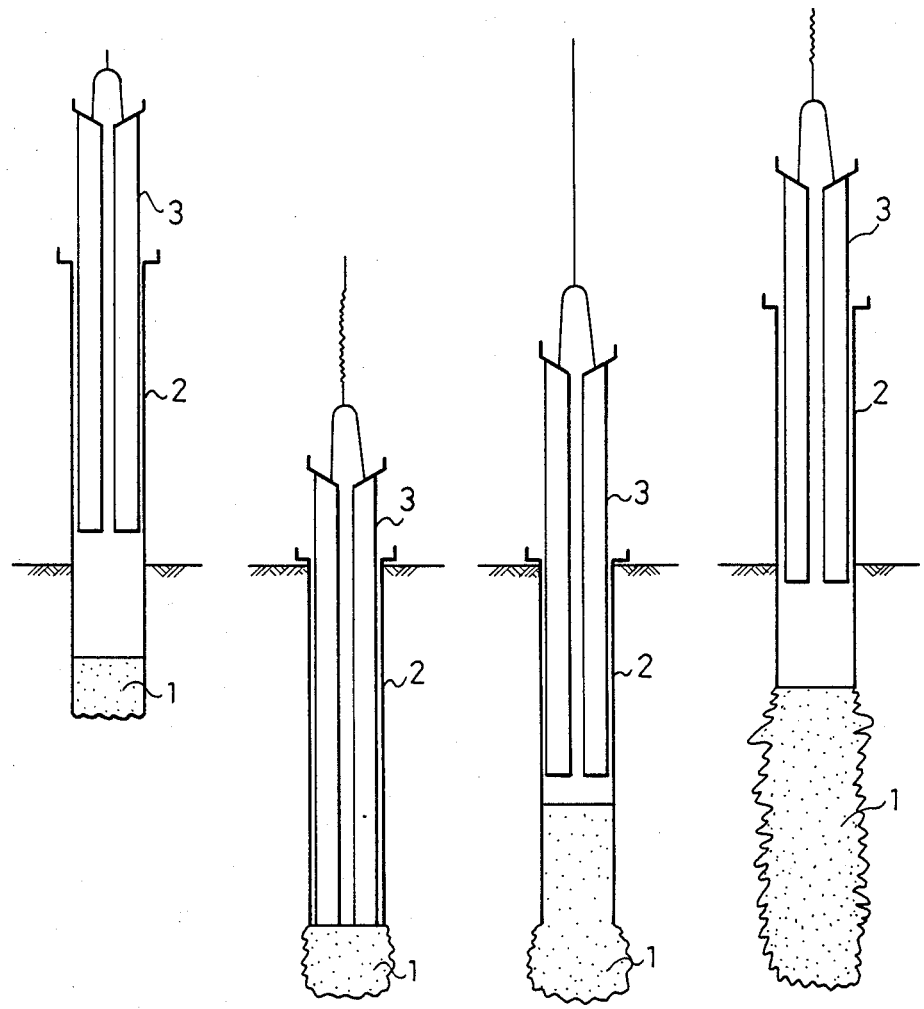
FIGS. 18 to 21 are sectional views illustrating the method of embedding a sand pile in accordance with the present invention.
Figures 22, 23, 24, 25:
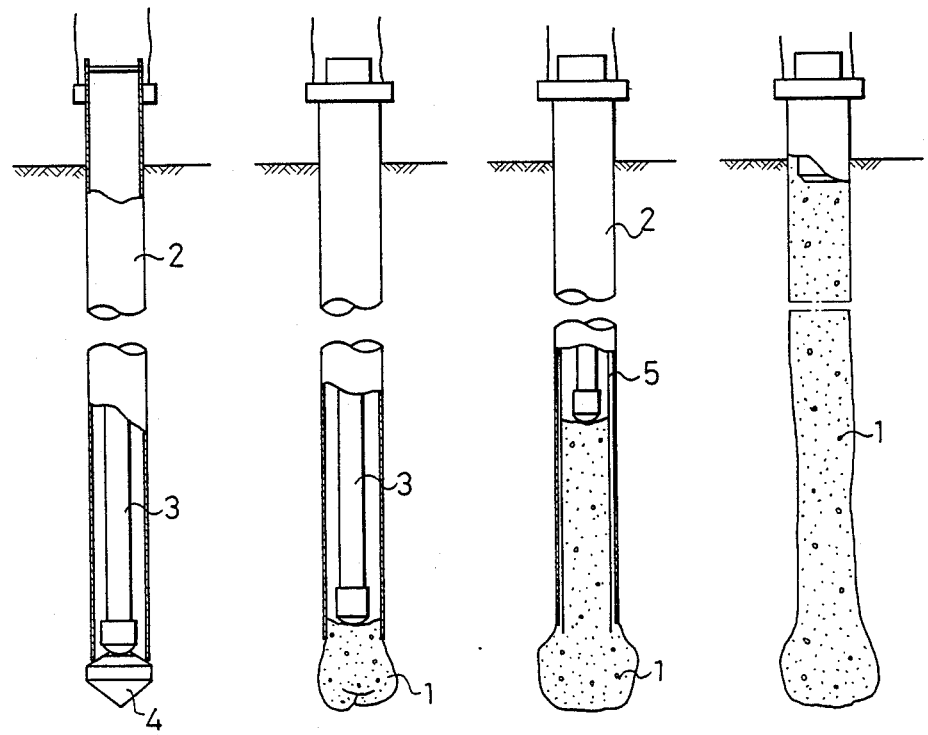
FIGS. 22 to 25 are sectional views showing the method of embedding a concrete pile in accordance with the present invention.

Cement paste was prepared by mixing and kneading granular ice at $-2°$ C. and cement at $-20°$ C. used in proportions of 0.3:1. Sample I which was taken from the paste immediately after the kneading, Sample II which was taken after leaving the paste in a room at 26° to 28° C. for 1.5 hours subsequent to the kneading, Sample III taken out after leaving the paste at room temperature for 2.5 hours and Sample IV as contrast sample which was a cement paste obtained by using water and cement at a room temperature in proportions of 0.3:1. Immediately after the kneading, each sample was sealedly charged into a foamed polystyrene heat-insulated box with inner dimensions of 10 cm by 10 cm by 10 cm and a wall thickness of 30 mm, and the temperature at the center of the box interior was measured. FIG. 17 shows the result.

The cement paste in the heat-inuulated box was elevated in temperature due to the heat of reaction produced by the hydration reaction. With Sample I, the hydration reaction could be greatly retarded. With Sample II, which was elevated in temperature by approximately 2° C. in being left at a room temperature for 1.5 hours, and Sample III, which was elevated in temperature by approximately 16° C. in being left for 2.5 hours, the hydration reaction also could be retarded compared to Sample IV which was prepared by kneading together water and cement at normal temperature

EXAMPLE H-1

This example concerns a method of constructing a sand compaction pile as shown in FIGS. 18 to 21.

The present invention is suitably applied to an operation on a soft and viscous ground so long as the ground has a low density sand-like character and the operation does not require compaction by dehydration.

Pile material 1 to be driven into the ground was prepared by mixing solid phase cement powder and small ice masses obtained by crushing ice to dry sand as aggregate. First, small ice masses were covered by cement powder, then cement powder and the covered small ice masses were mixed, and then the aggregate was added. The water-cement ratio was set, for example, to 20 to 30%. The apparatus used for the operation may be what is used for the conventional construction of a sand compaction pile. The illustrated apparatus consists of outer and inner pipes 2 and 3.

In operation, the required quantity of pile material 1 was charged into the outer pipe 2 through the inner pipe 3 by striking the inner pipe 3 and the outer pipe 2 was driven to a predetermined depth into the ground with the material 1 in a plugging state. Subsequently, the material 1 was charged into the outer pipe 2 while raising the outer pipe 2, and the inner pipe 3 was struck while it was moved vertically. In this way, the material 1 was driven into the ground and compacted.

The driving and compaction of material in the above manner were repeated, whereby a pile was formed by the material supplied into the ground.

The small ice masses incorporated in the solid state were progressively melted to cause hydration reaction of cement, which was thus solidified with sand, whereby a sand pile having a considerable mechanical strength could be obtained.

EXAMPLE H-2

This example concerns a method of constructing a site-driven concrete pile as shown in FIGS. 22 to 25. The pile material 1 to be driven into the ground was prepared by mixing solid phase cement powder and small ice masses obtained by crushing ice to dry sand as aggregate. The water-cement ratio was set to 15 to 30%.

In operation, a shoe 4 was provided at the lower end of the outer pipe 2, which was then driven together with the inner pipe 3 to a predetermined depth into the ground. Then, the material 1 was charged, and the outer pipe 2 was raised while compacting the material with the inner pipe 3. If necessary, reinforcement iron bars 5 may be inserted into the outer pipe 2 prior to the charging of the material 1.

INDUSTRIAL APPLICABILITY

As has been described above, the method of producing and applying cement-containing composition using small ice masses according to the present invention enables a low watercement ratio mortar having high quality and high homogeneity. This is achieved through a macroscopically homogeneous system obtained by mixing and kneading of the composition in the quasi-solid state and then transition to a homogeneous mixture with the molding of small ice masses without spoiling the workability. In addition, separation of aggregate is less liable to result. Based on these advantages, the method can find extensive applications to the molding and laying of ordinary concrete and mortar used in the civil and construction fields, laying of heavy concrete and laying of concrete under cold conditions or under other special conditions. Further, the method according to the present invention may be utilized for plant molding of cement concrete using high pressure press molder, laying of side-charged concrete and long-distance and long-time transportation of mortar or the like in the quasi-solid state.

I claim:

1. Method of producing a low water-cement ratio mortar with small ice masses used in lieu of water comprising the steps of:

mixing and kneading together cement, aggregate and small ice masses in a quasi-solid state wetted by a small quantity of water resulting on the surfaces of said small ice masses from melting thereof into a macroscopically homogeneous system; and causing gradual transition of the composition from said macroscopically homogeneous system into a homogeneous mixture with the melting of said small ice masses to cause the mixture to become sufficiently viscous to suppress separation of the aggregate, said small ice masses being substantially entirely melted prior to the instant of charging of the mortar thus obtained.

2. The method of producing a mortar according to claim 1, wherein said small ice masses are either sliced ice obtained using an ice slicer, ice in a granular form, small ice pieces or snow.

3. The method of producing a mortar according to claim 1, wherein said small ice masses are obtained by dissolving a water-soluble polymer in water and freezing the resultant solution.

4. The method of producing a mortar according to claim 1, wherein a water-soluble polymer is added in the form of powder.

5. The method of producing a mortar according to claim 4, wherein said water-soluble polymer is methylcellulose.

6. A method of producing a heavy concrete containing high specific gravity aggregate with small ice masses used in lieu of water comprising the steps of:
   mixing and kneading together cement, aggregate and small ice masses in a quasi-solid state wetted by a small quantity of water resulting on the surfaces of said small ice masses from the melting thereof into a macroscopically homogeneous system; and
   causing gradual transition of the composition from said macroscopically homogeneous system into a homogeneous mixture with the melting of said small ice masses to cause the mixture to become sufficiently viscous to suppress separation of the aggregate.

7. The method of producing a heavy concrete according to claim 6, wherein the specific gravity of the aggregate is 3.0 or above.

8. The method of producing a heavy concrete according to claim 6, wherein the water-cement ratio is set to be less than 45%.

9. A method of producing a low-temperature mortar, to be charged under a low temperature condition with small ice masses used in lieu of water comprising the steps of:
   mixing and kneading together cement, aggregate and small ice masses in a quasi-solid state wetted by small quantity of water resulting on the surfaces of said small ice masses from the melting thereof into a macroscopically homogeneous system; and
   causing gradual transition of the composition from said macroscopically homogeneous system; and
   causing gradual transition of the composition from said macroscopically homogenous system into a homogeneous mixture with the melting of said small ice masses to cause the mixture to be come sufficiently viscous to suppress separation of the aggregate, said small ice masses being substantially entirely melted prior to the instant of charging of the mortar thus obaained.

10. The method of producing a low temperature mortar according to claim 9, wherein the water-cement ratio is set to be less than 45%.

11. The method of producing a low temperature mortar having a cement system composition containing reinforcement fiber comprising the steps of:
   forming small ice masses containing said reinforcement fiber by freezing together said reinforcement fiber and water to be incorporated;
   mixing and kneading together cement, aggregate and said small ice masses in a quasi-solid state wetted by a small quantity of water resulting on the surfaces of said small ice masses from the melting thereof into a macroscopically homogenous system; and
   causing gradual transition of the composition from said macroscopically homogeneous system into a homogeneous mixture with said reinforcement fiber dispersed therein with the melting of said small ice masses to cause the mixture to become suffcient1y viscous to suppress separation of the aggregate, said small ice masses being substantially entirely melted prior to the instant of charging of the mortar thus obtained.

12. A method of molding a low water-cement ratio mortar with small ice masses used in lieu of water comprising the steps of:
   mixing and kneading together cement, aggregate and small ice masses in a quasi-solid state wetted by a small quantity of water resulting on the surfaces of said small ice masses from the melting thereof into a macroscopically homogeneous system; and
   causing gradual transition of the composition from said macrocopically homogenous system into a homogeneous system into a homogeneous mixture with the melting of said small ice pieces to cause the mixture to become sufficiently viscous to suppress separation of the aggregate and a hydration reaction of water resulting from the melting and cement.

13. The method of molding a mortar according to claim 12, wherein the water-cement ratio is set to be less than 45%

14. The method of molding a mortar according to claim 13, wherein said mortar is for press molding with a molding pressure of 30 kg/cm$^2$ or above.

15. A method of transporting a mortar comprising the steps of:
   adding small ice masses to cement or to cement and aggregate;
   kneading together the mixture in a quasi-solid state wetted by a small quantity of water resulting on the surfacs of said small ice masses from the melting thereof into a macroscopically homogeneous system and causing cement or cement and aggregate to cover the ice masses to provide a heat isnulation layer to thereby suppress the hydration reaction; and
   transporting the mortar thus prepared with less hydration than would otherwise occur in the absence of said heat insulation layer.

16. The method of transporting a mortar according to claim 15, wherein the mortar is transported in a state accommodated in a heat insulated space or in a cooled space.

* * * * *